(12) United States Patent
Colburn et al.

(10) Patent No.: US 12,061,347 B2
(45) Date of Patent: Aug. 13, 2024

(54) METASURFACES FOR FULL-COLOR IMAGING

(71) Applicant: University of Washington, Seattle, WA (US)

(72) Inventors: Shane Colburn, Seattle, WA (US); Alan Zhan, Seattle, WA (US); Arka Majumdar, Seattle, WA (US)

(73) Assignee: University of Washington, Seattle, WA (US)

( * ) Notice: Subject to any disclaimer, the term of this patent is extended or adjusted under 35 U.S.C. 154(b) by 916 days.

(21) Appl. No.: 16/965,899

(22) PCT Filed: Jan. 29, 2019

(86) PCT No.: PCT/US2019/015704
§ 371 (c)(1),
(2) Date: Jul. 29, 2020

(87) PCT Pub. No.: WO2019/148200
PCT Pub. Date: Aug. 1, 2019

(65) Prior Publication Data
US 2021/0037219 A1    Feb. 4, 2021

Related U.S. Application Data

(60) Provisional application No. 62/623,170, filed on Jan. 29, 2018.

(51) Int. Cl.
*G02B 3/00* (2006.01)
*G02B 27/00* (2006.01)
(Continued)

(52) U.S. Cl.
CPC ....... *G02B 3/0056* (2013.01); *G02B 27/0075* (2013.01); *G02B 27/4211* (2013.01); *H04N 9/03* (2023.01); *H04N 23/67* (2023.01)

(58) Field of Classification Search
CPC .............. G02B 3/0056; G02B 27/0075; G02B 27/4211; G02B 5/1842; G02B 5/1871; G02B 1/005; H04N 9/03; H04N 23/67
(Continued)

(56) References Cited

U.S. PATENT DOCUMENTS

2013/0120550 A1* 5/2013 Chen ................... G02B 21/367
359/371
2014/0111856 A1   4/2014 Brug et al.
(Continued)

FOREIGN PATENT DOCUMENTS

JP   2013162369   8/2013
JP   2014230239   12/2014
(Continued)

OTHER PUBLICATIONS

Zhan, A., et al., "Metasurface Freeform Nanophotonics," Scientific Reports 7:1673; https://Avww.nature.com/articles 's41598-017-01908-9 pdf> May 10, 2017 (Year: 2017).*
(Continued)

*Primary Examiner* — Usman A Khan
(74) *Attorney, Agent, or Firm* — Christensen O'Connor Johnson Kindness PLLC

(57) ABSTRACT

Metasurfaces and systems including metasurfaces for imaging and methods of imaging are described. Such metasurfaces may be formed on a substrate from a plurality of posts. The metasurfaces are configured to be optically active over a wavelength range and in certain embodiments are configured to form lenses. In particular, the metasurfaces described herein may be configured to focus light passed through the metasurface in an extended depth of focus. Accordingly, the disclosed metasurfaces are generally suitable for generating color without or with minimal chromatic aberrations, for example, in conjunction with computational reconstruction.

20 Claims, 21 Drawing Sheets

(51) Int. Cl.
 *G02B 27/42* (2006.01)
 *H04N 9/03* (2023.01)
 *H04N 23/67* (2023.01)
(58) Field of Classification Search
 USPC .......................................................... 348/335
 See application file for complete search history.

(56) References Cited

U.S. PATENT DOCUMENTS

| | | |
|---|---|---|
| 2016/0306079 A1 | 10/2016 | Arbabi et al. |
| 2017/0045652 A1 | 2/2017 | Arbabi et al. |
| 2017/0212285 A1 | 7/2017 | Arbabi et al. |
| 2017/0219739 A1 | 8/2017 | Lin et al. |
| 2017/0322418 A1 | 11/2017 | Lin et al. |
| 2018/0231702 A1 | 8/2018 | Lin et al. |
| 2018/0284428 A1* | 10/2018 | Guenter ................. H04N 23/57 |
| 2021/0181594 A1* | 6/2021 | Jain ....................... G01S 7/4817 |

FOREIGN PATENT DOCUMENTS

| | | |
|---|---|---|
| JP | 2020-541555 | 1/2019 |
| WO | 2017044637 A1 | 3/2017 |
| WO | WO 2017/044637 | 3/2017 |

OTHER PUBLICATIONS

International Preliminary Report on Patentability mailed Aug. 4, 2020, issued in corresponding International Application No. PCT/US2019/15704, filed Jan. 29, 2019, 7 pages.
Heide, et al., "High-Quality Computational Imaging through Simple Lenses," ACM Trans Graph, 2013, 32(5), 14 pages.
Schuler, C.J., et al., "Non-stationary Correction of Optical Aberrations," 2011 International Conference on Computer Vision, 2011, 659-666.
Yu, F., et al., "Flat optics with designer metasurfaces," Nature Materials, 2014, 13, 139-150.
Kildishev, A.V., et al., "Planar Photonics with Metasurfaces," Science, 2013, 339, 8 pages.
Yu, N., et al., "Light Propagation with Phase Discontinuities: Generalized Laws of Reflection and Refraction," Science, 2011, 334, 333-337.
Jahani, S., et al., "All-dielectric metamaterials," Nat. Nanotechnol., 2016, 11, 23-36.
Arabi, A., et al., "Efficient dielectric metasurface collimating lenses for mid-infrared quantum cascade lasers," Opt. Express., 2015, 23, 33310-33317.
West, P.R., et al., "All-dielectric subwavelength metasurface focusing lens," Opt. Express., 2014, 22, 26212-26221.
Lu, F., et al., "Planar high-numberical-aperture low-loss focusing reflectors and lenses using subwavelength high contrast gratings," Opt. Express., 2010, 18, 12606-12614.
Arabi, A., et al., "Subwavelength-thick lenses with high numerical apertures and large efficiency based on high-contrast transmitarrays," Nat. Commun., 2015, 1-6.
Lin, D., et al., "Dielectric gradient metasurface optical elements," Science, 2014, 345, 298-302.
Fattal, D., et al., "Flat dielectric grating reflectors with focusing abilities," Nat. Photonics., 2010, 4, 466-470.
Aieta, F., et al., "Aberrration-Free Ultrathin Flat Lenses and Axicons at Telecom Wavelengths Based on Plasmonic Metasurfaces," Nano Lett., 2012, 12, 4932-4936.
Ni, X., et al., "Metasurface holograms for visible light," Nat. Commun. Lond., 2013, 4, 2807, 1-6.
Zheng, G., et al., "Metasurface holograms reaching 80% efficiency," Nat. Nanotechnol., 2015, 10, 308-312.
Lelanne, P., et al., "Design and fabrication of binary diffractive elements with sampling periods smaller than the structural cutoff," J. Opt. Soc. Am. A., 1999, 16(5), 1143-1156.
Lelanne, P., et al., "Blazed binary subwavelength gratings with efficiencies larger than those of conventional echelette gratings," Opt. Lett., 1998, 23(14), 1081-1083.
Astilean, S., et al., "High-effciency subwavelength diffractive element patterned in a high-refractive-index material for 633 nm," Opt. Lett., 1998, 23(7), 552-554.
Arbabi, A., et al., "Dielectric metasurfaces for complete control of phase and polarization with subwavelength spatial resolution and high transmission," Nat. Nanotechnol., 2015, 10, 937-943.
Khorasaninejad, M., et al., "Metalenses at visible wavelengths: Diffraction-limited focusing and subwavelength resolution imaging," 2016, 352, 1190-1194.
Khorasaninejad, M., et al., "Multispectral Chiral Imaging with a Metalens," Nano Lett., 2016, 16, 4595-4600.
Arbabi, A., et al., "Miniature optical planar camera based on a wide-angle metasurface doublet corrected for monochromatic aberrations," Nat. Commun., 2016, 7, 1-9.
Aieta, F., et al., "Multiwavelength achromatic metasurfaces by dispersive phase compensation," 2015, Science, 347(6228), 1342-1345.
Arbabi, E., et al., "Multiwavelength polarization-insensitive lenses based on dielectric metasurfaces with meta-molecules," Optica., 2016, 3, 628-633.
Arbabi, E., et al., "Multiwavelength metasurfaces through spatial multiplexing," Sci. Rep., 2016, 6, 32803, 1-8.
Avayu, O., et al., "Composite functional metasurfaces for multispectral achromatic optics," Nat. Commun., 2017, 8, 14992, 1-7.
Wang, B, et al., "Visible-Frequency Dielectric Metasurfaces for Multiwavelength Achromatic and Highly Dispersive Holograms," Nano Lett., 2016, 16, 5235-5240.
Khorasaninejad, M., et al., "Achromatic Metalens over 60 nm Bandwidth in the Visible and Metalens with Reverse Chromatic Dispersion," Nano Lett., 17, 1819-1824.
Arbabi, E., et al., "Controlling the sign of chromatic dispersion in diffractive optics with dielectric metasurfaces," Optica., 2017, 4(6), 625-632.
Dowski, E.R., et al., "Extended depth of field through wave-front coding," Appl. Opt., 1995, 34(11), 1859-1866.
Wach, H.B., et al., "Control of chromatic focal shift through wave-front coding," Appl. Opt., 1998, 37, 5359-5367.
Cathey, W.T., et al., "New paradigm for imaging systems," Appl. Opt., 2002, 41(29), 6080-6092.
Zhan, A., et al., "Metasurface Freeform Nanophotonics," Sci. Rep., 2017, 7, 1673, 1-9.
Zhan, A., et al., "Low-Contrast Dielectric Metasurface Optics," ACS Photonics, 2016, 3, 209-214.
Goodman, J.W., "Introduction to Fourier Optics," Roberts and Company Publishers, 2005, 457 pages.
Arabi, A., et al., "Planar metasurface retroreflector," Nature Photonics, 2017, 1-9.
Heide, F., et al., "FlexISP: A Flexible Camera Image Processing Framework," ACM Trans Graph, 2014, 33(6), 231, 13 pages.
Liu, V., "S4: A free electromagnetic solver for layered periodic structures," Comput. Phys. Commun., 2012, 183, 2233-2244.
Wang, Z., et al., "Image Quality Assessment: From Error Visibility to Structural Similarity," IEEE Trans. Image Process., 2004, 13(4), 600-612.
Ohta, M. et al., "Rotationally symmetric wavefront coding for extended depth of focus with annular phase mask," Jpn. J. Appl. Phys., 2015, 54, 09ME03, 8 pages.
Lohmann, A.W., "Scaling laws for lens systems," Appl. Opt., 1989, 28(23), 4996-4998.
Getreuer, P., "Total Variation Deconvolution using Split Bregman," 2012, Image Process. Line., 2012, 2, 158-174.
Chen, B.H., "GaN Metalens for Pixel-Level Full-Color Routing at Visible Light," Nano Lett., 17, 6345-6352.
Extended European Search Report mailed Sep. 20, 2021, issued in related European Patent Application No. 19744321.1, filed Jan. 29, 2019, 9 pages.
Grote, R.R., et al., "Imaging A Nitrogen-Vacancy Center With a Diamond Immersion Metalens," Arxiv.org, Cornell University Library, 201 Olin Library Cornell University Ithaca, NY, Nov. 2, 2017, XP081444763, DOI: 10.1038/S41467-019-102358-5.

(56) References Cited

OTHER PUBLICATIONS

Zhan, A., et al., "Dielectric Metasurface-Based Freeform Optics," Proceedings of SPIE, SPIE, US, vol. 101113, Feb. 20, 2017, pp. 1011306-1011306.

Colburn, S., et al., "Metasurface Optics for Full-Color Computational Imaging," Science Advances 4(2), eaar2114; http://advances.sciencemag.org/conten/advances/4/2/eaar2114.full.pdf> Feb. 9, 2018 [retrieved Mar. 26, 2019], 7 pages.

International Search Report mailed Apr. 29, 2019, issued in corresponding International Application No. PCT/US2019/15704, filed Jan. 29, 2019, 2 pages.

Written Opinion mailed Apr. 29, 2019, issued in corresponding International Application No. PCT/US2019/15704, filed Jan. 29, 2019, 6 pages.

Zhan, A., et al., "Metasurface Freeform Nanophotonics," Scientific Reports 7:1673; https://www.nature.com/articles/s41598-017-01908-9.pdf> May 10, 2017 [retrieved Mar. 26, 2019], 9 pages.

Japanese Office Action for Patent Application No. 2020-541555, mailed Feb. 6, 2023.

Examination Report mailed Sep. 12, 2023, issued in related European Application No. 19744321.1 filed Jan. 29, 2019, 7 pages.

\* cited by examiner

FIG. 1A FIG. 1B

| Blue | Green | Red |

Blue　　　　　Green　　　　　Red

METASURFACES FOR FULL-COLOR IMAGING

CROSS-REFERENCE TO RELATED APPLICATION

This application is a National Stage of International Application No. PCT/US2019/015704, filed Jan. 29, 2019, which claims the benefit of U.S. Patent Application No. 62/623,170, filed Jan. 29, 2018, the disclosure of which is hereby incorporated by reference in its entirety.

BACKGROUND

Modern cameras include systems of cascaded and bulky glass optics for imaging with minimal aberrations. While these systems provide high quality images, the improved functionality comes at the cost of increased size and weight, limiting their use for a variety of applications in which compact image sensors may be preferable. One route to reduce a system's complexity is via computational imaging, in which much of the aberration correction and functionality of the optical hardware is shifted to post-processing in the software realm, enabling high quality images with significantly simpler optics. Alternatively, the designer could miniaturize the optics by replacing them with diffractive optical elements (DOEs), which mimic the functionality of refractive systems in a more compact form factor. Metasurfaces are an extreme example of such DOEs, in which quasiperiodic arrays of resonant subwavelength optical antennas impart spatially-varying changes on a wavefront. These elements are of wavelength-scale thickness, enabling highly compact systems, while the large number of degrees of freedom in designing the subwavelength resonators has enabled unprecedented functionalities and flat implementations of lenses, holographic plates, blazed gratings, and polarization optics.

Designing achromatic metasurface lenses for imaging under broadband illumination remains an outstanding problem in the metasurface community. The strong chromatic aberrations in metasurfaces originate from both the local resonant behavior of the sub-wavelength optical scatterers, as well as from phase wrapping discontinuities arising from the spatial arrangement of the scatterers. For lenses, this chromaticity manifests as wavelength-dependent blur in images, which constrains metasurface-based imaging to narrowband operation. There is a vast body of work attempting to solve this problem; however, thus far the presented solutions either work for discrete wavelengths or narrow bandwidths.

SUMMARY

Toward this end, the present disclosure provides metasurfaces, systems including metasurfaces, and methods of generating images using metasurfaces to realize full-color imaging and to generate high quality images under, for example, broadband white light illumination spanning the whole visible regime.

Accordingly, in an aspect the present disclosure provides metasurface having an optical activity over a wavelength range, comprising: a plurality of posts comprising a first material having a first refractive index and arranged on a substrate in a square pattern; and interstices between individual posts of the plurality of posts comprising an interstitial substance with a second refractive index less than the first refractive index; wherein a diameter of the posts of the plurality of posts varies rotationally asymmetrically about an optical axis of the metasurface While separately both computational imaging and metasurfaces are promising avenues toward simplifying optical systems, a synergistic combination of these fields can further enhance system performance and facilitate advanced capabilities, for example, for use in full visible spectrum imaging with metasurfaces. Accordingly, in an another aspect, the present disclosure provides an imaging system comprising: a metasurface having an optical activity over a wavelength range, comprising: a plurality of posts comprising a first material having a first refractive index and arranged on a substrate in a square pattern; and interstices between individual posts of the plurality of posts comprising an interstitial substance with a second refractive index less than the first refractive index, wherein a diameter of the posts of the plurality of posts varies rotationally asymmetrically about an optical axis of the metasurface; a photodetector positioned to absorb light that has passed through the metasurface and configured to generate a signal based upon the absorbed light; and a controller operatively coupled to the photodetector, the controller including logic that when executed by the controller, causes the device to perform operations including: generating a plurality of signals, with the photodetector, based upon light within the wavelength range passed through the metasurface; computationally reconstructing the plurality of signals to provide a plurality of computationally reconstructed signals; and generating, with the plurality of computationally reconstructed signals, an image based upon the light absorbed by the photodetector.

In yet another aspect, the present disclosure provides a method of generating an image comprising: generating a plurality of signals with a photodetector based on light passed through a metasurface, wherein the metasurface comprises: a plurality of posts comprising a first material having a first refractive index and arranged on a substrate in a square pattern; and interstices between individual posts of the plurality of posts comprising an interstitial substance with a second refractive index less than the first refractive index, wherein a diameter of the posts of the plurality of posts varies rotationally asymmetrically about an optical axis of the metasurface; computationally reconstructing the plurality of signals to provide a plurality of computationally reconstructed signals; and generating, with the plurality of computationally reconstructed signals, an image based upon the light absorbed by the photodetector.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 1A-1G: Design, simulation, and fabrication of imaging metasurfaces. (A) The metasurfaces are made up of silicon nitride nanoposts, where the thickness T, lattice constant p, and diameter d are the design parameters. (B) Schematic of a metasurface comprising an array of nanoposts. (C) Simulation of the nanoposts' transmission amplitude and phase via rigorous coupled-wave analysis. Simulated intensity along the optical axis of the singlet metasurface lens (D) and extended depth of focus metasurface (E) where going from top to bottom in each panel 400 nm, 550 nm, and 700 nm wavelengths are used. The dashed lines indicate the desired focal plane, where the sensor will be placed. Optical images of the singlet metasurface lens (F) and the extended depth of focus device (G). Scale bars are 25 µm.

DETAILED DESCRIPTION

Disclosed herein are metasurfaces and systems including metasurfaces. Such metasurfaces may be formed on a substrate from a plurality of posts. The metasurfaces are configured to be optically active over a wavelength range and in certain embodiments are configured to form lenses. In particular, the metasufaces described herein are configured to focus light passed through the metasurface in an extended depth of focus. Accordingly, the disclosed metasurfaces are generally suitable for generating color images without or with minimal chromatic aberrations, for example, in conjunction with post-processing, such as computational reconstruction.

Metasurfaces

Figure 7A:
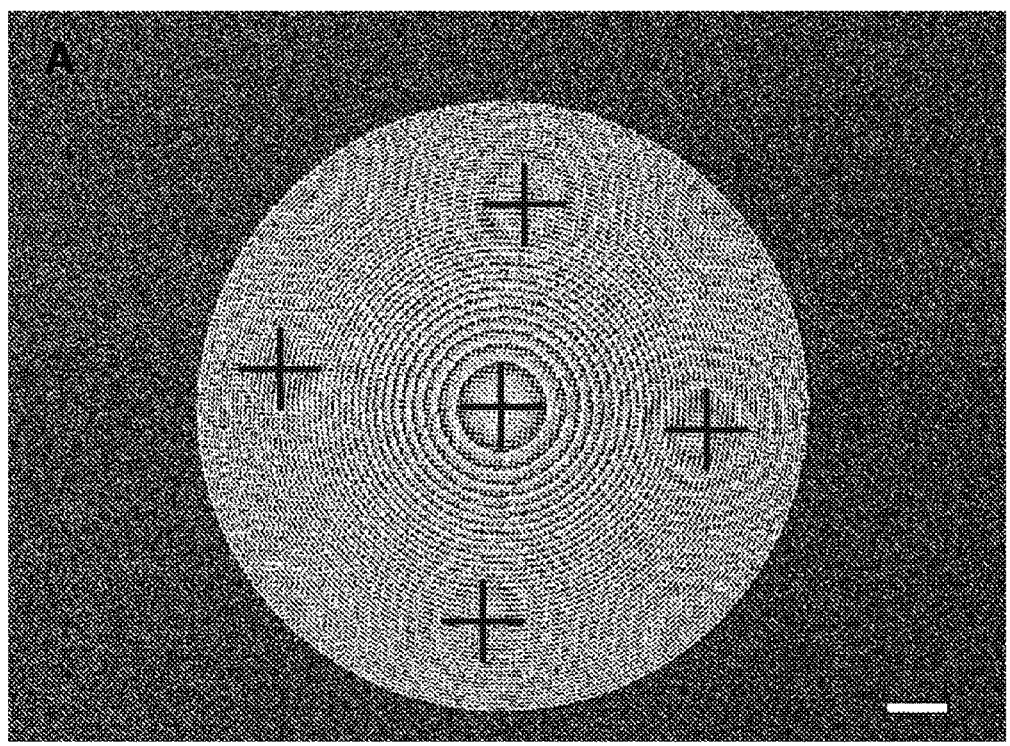
FIGS. 7A and 7B: Scanning electron micrographs of the fabricated metasurfaces. (A) View of a fabricated metasurface lens (scale bar is 20 µm). (B) High-magnification view of a lens, showing individual nanoposts (scale bar is 2 µm).
Figure 7B:
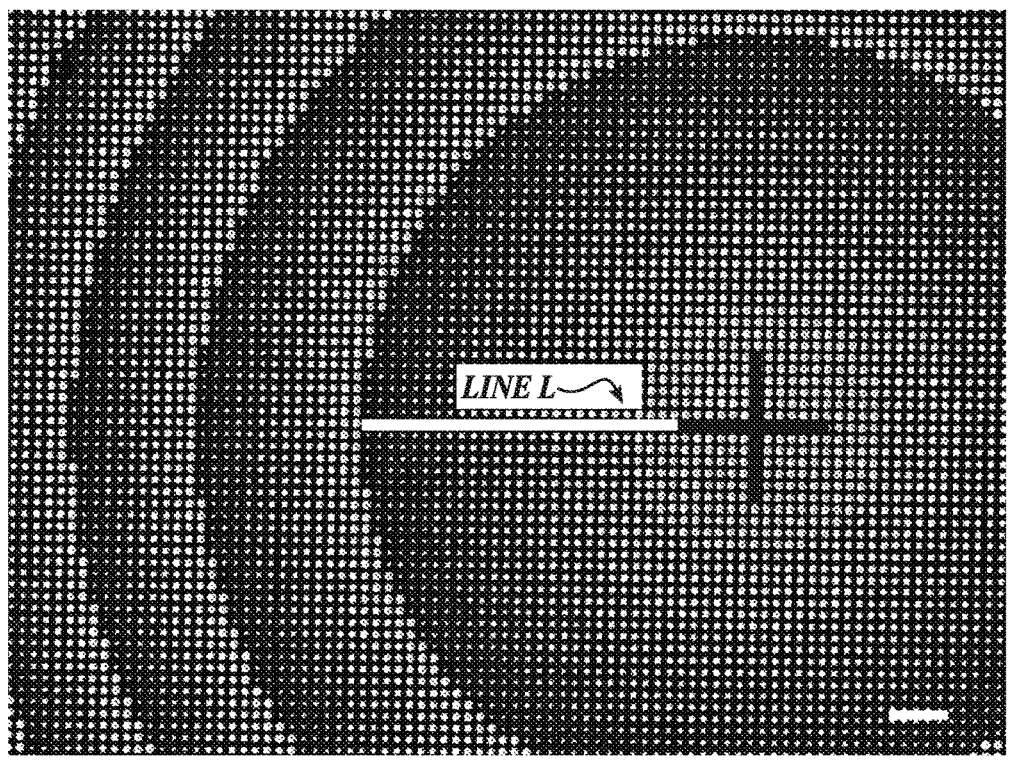

In one aspect, the present disclosure provides a metasurface having an optical activity is provided. In one embodiment, the metasurface includes a plurality of posts comprising a first material having a first refractive index and arranged on a substrate in a square pattern; and interstices between individual posts of the plurality of posts comprising an interstitial substance with a second refractive index less than the first refractive index. In an embodiment, a diameter of the posts of the plurality of posts varies rotationally asymmetrically about an optical axis of the metasurface, as discussed further herein with respect to FIGS. 7A and 7B.

As above, the metasurfaces described herein have an optical activity over a wavelength range. The optical activity arises when light in the wavelength range impinges on the metasurface. In one embodiment, as disclosed in the EXAMPLES, the metasurface is configured to provide the desired optical activity when the light impinges on the metasurface perpendicular to the substrate. In other embodiments, non-perpendicular impingement angles also give rise to optical activity. Metasurfaces designed for non-perpendicular impingement have a different phase profile to account for the angle of incidence. The same post diameter(s) and thickness(es) can be used, it is only their orientation that is changed.

In one embodiment, the optical activity is selected from the group consisting of diffraction and reflection. As used herein, the term "optical activity" is primarily used to describe diffraction of light as it passes through the metasurface and is affected by the plurality of posts. In other embodiments, however, the optical activity is reflection, based on metasurfaces configured to reflect instead of diffract impinging light. Based on the parameters selected, particularly by varying thickness and periodicity a metasurface can be fabricated that will reflect instead of diffract light.

A representative metasurface is illustrated in FIGS. 1A and 1B and comprises a plurality of cylindrical posts formed from a first material on a substrate in a square pattern. The substrate can be any material sufficient to support the plurality of posts and that does not adversely affect the optical effects of the metasurface. Glass is an exemplary substrate. In one embodiment the substrate is essentially flat. In another embodiment, the substrate is curved. By the nature of the metasurfaces, and the ease of their patterning, both flat and curved surfaces can be patterned with the metasurface.

Each of the posts is defined by a diameter ("d" in FIG. 1A), a thickness ("t" in FIG. 1A; also referred to as the height of the post), and a periodicity ("p" in FIG. 1A; defined by the center-to-center distance, in the plane of the substrate, between adjacent posts).

As above, the metasurface has optical activity over a wavelength range. Such a wavelength range can include, for example, visible light, infrared light, ultraviolet light, or the like. In an embodiment, the wavelength range includes light in a range of about 400 nm to about 700 nm.

In an embodiment, a periodicity of the plurality of posts is less than a smallest wavelength in the wavelength range. For example, where the wavelength range includes visible light and the smallest wavelength in the wavelength range is 400 nm, the periodicity of the plurality of posts is less than 400 nm.

In an embodiment, a diameter of the plurality of posts is in a range of about 25% of the smallest wavelength in the wavelength range and about 90% of the smallest wavelength in the wavelength range. In an embodiment, a diameter of the plurality of posts is in a range of about 35% of the smallest wavelength in the wavelength range and about 85% of the smallest wavelength in the wavelength range.

In an embodiment, the thickness of the plurality of posts is in a range of about 0.75 times a mean wavelength of the wavelength range and about 1.5 times the mean wavelength of the wavelength range. In an embodiment, the thickness of the plurality of posts is in a range of about 0.8 times a mean wavelength of the wavelength range and about 1.2 times the mean wavelength of the wavelength range.

As above, the first material of the metasurface has a first refractive index different than a refractive index of the interstitial substance. In an embodiment, a difference between the refractive index of the first material and the refractive index of the interstitial substance is at least about 0.5. In an embodiment, the difference between the refractive index of the first material and the refractive index of the interstitial substance is in a range of about 0.5 to about 1.7.

In an embodiment, the refractive index of the first material is in a range of about 1.5 to about 2.8. In an embodiment, the refractive index of the first material is in a range of about 1.8 to about 2.7.

The first material can be selected based upon, for example, refractive index, such as a refractive index relative to an interstitial substance, suitability for manufacturing a plurality of posts, and the like. In an embodiment, the first material includes silicon nitride. In an embodiment, the first material includes a polymer.

In an embodiment, the interstitial substance is air or another gas. In an embodiment, the interstitial substance is a polymer.

While posts are illustrated and described, it will be understood that other waveguides protruding from a substrate can be used, such as where a periodicity of the waveguides is below a wavelength of a smallest wavelength in a wavelength range. Examples of such additional waveguide structures can include, for example, fins, Vs, and the like. The design parameters and materials described elsewhere herein apply to such additional waveguide structures.

In an embodiment, the optical activity of the metasurface includes lensing. In an embodiment, the metasurface defines a lens shaped to produce a lens effect on light in the wavelength range passing through the metasurface. In an embodiment, such a lensing effect is due in part on a post diameter gradient along a length of the metasurface. As shown in, for example, FIG. 7B, diameters of posts differ along the illustrated line to define a post-diameter gradient. Such differences in post diameter are configured to alter a phase of light passing through the metasurface and contribute to the lensing effect.

In an embodiment, the metasurfaces described herein are configured to focus light in the wavelength range passed through the metasurface in an extended depth of focus. As used herein, an extended depth of focus refers to a distance over which a sensor position can be shifted such that the object being imaged remains in focus. Depth of focus for a lens is typically $4\lambda N^2$, where $\lambda$ is wavelength, and N is f-number. An extended depth of focus is one where a depth of focus deviates from this formula and is longer. As discussed further herein with respect to the EXAMPLES, the extended depth of focus is substantially spectrally invariant over the wavelength range. Further, the metasurfaces of the present disclosure may be configured to code a wavefront of light in the wavelength range passing through the metasurface. In this regard, signals generated by a photodetector receiving light in the extended depth of focus may be post-processed, such as by digitally filtering and deconvoluting such signals, the generate an image of a point source with fewer chromatic aberrations than a metasurface without an extended depth of focus.

In an embodiment, the metasurfaces of the present disclosure define a plurality of posts with diameters that vary rotationally asymmetrically. As shown in the FIGS. 7A and 7B, diameters of the posts vary about a central portion (shown here as cross-hairs) to define a series of concentric rings about which the post diameters vary. As further shown, diameters of the posts further vary to define a plurality of concentric rings (also shown as cross-hairs) not coaxial with the central portion. In the illustrated embodiment, the metasurface defines such non-coaxial concentric rings disposed about the central portion and in opposing pairs, although other configurations are possible.

In an embodiment, the asymmetric variation of post diameter follows a cubic function. In this regard, the metasurface may be a cubic phase plate defined by patterning of the plurality of posts and diameters thereof. In an embodiment, a phase profile of light passed through the metasurface is given by the equation:

$$\varphi = \frac{2\pi}{\lambda}(\sqrt{x^2 + y^2 + f^2} - f) + \frac{\alpha}{L^3}(x^3 + y^3)$$

wherein,
f is a focal length of the metasurface,
x and y are coordinates of the metasurface in a plane of the substrate,
z is a propagation direction of the metasurface,
λ is an operating wavelength of the metasurface,
L is half of an aperture width of the metasurface, and
α is cubic phase strength of the of metasurface.

Figure 10A:
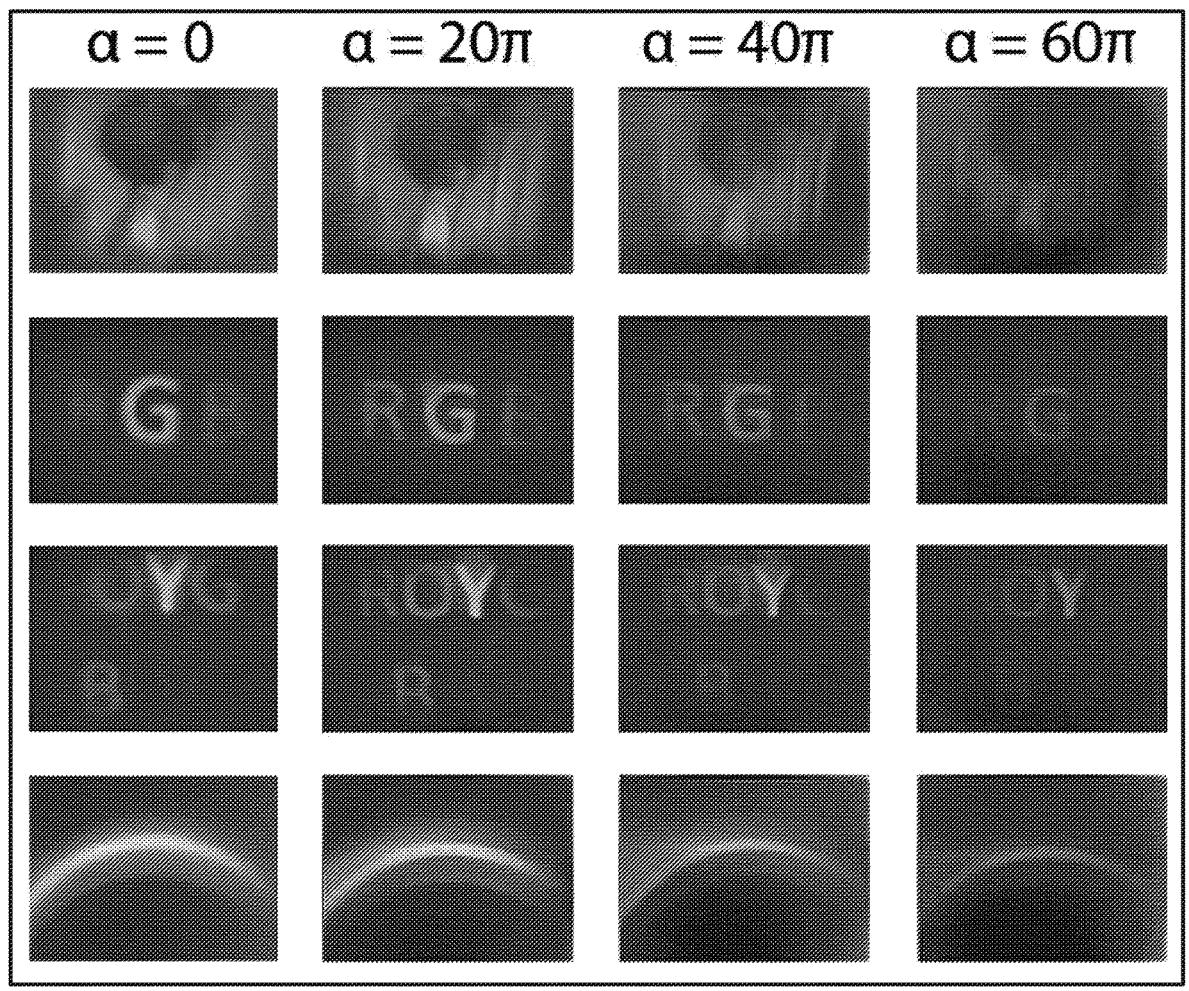
FIGS. 10A and 10B: Images captured with systems of different cubic phase strength. (A) Images captured and processed using lenses with different cubic phase strengths, a, showing reduced single-to-noise (SNR) at higher α, but also reduced color ringing and chromatic blur. (B) MTFs for green light for devices with different cubic phase strengths, showing a reduction in SNR for higher α.
Figure 10B:
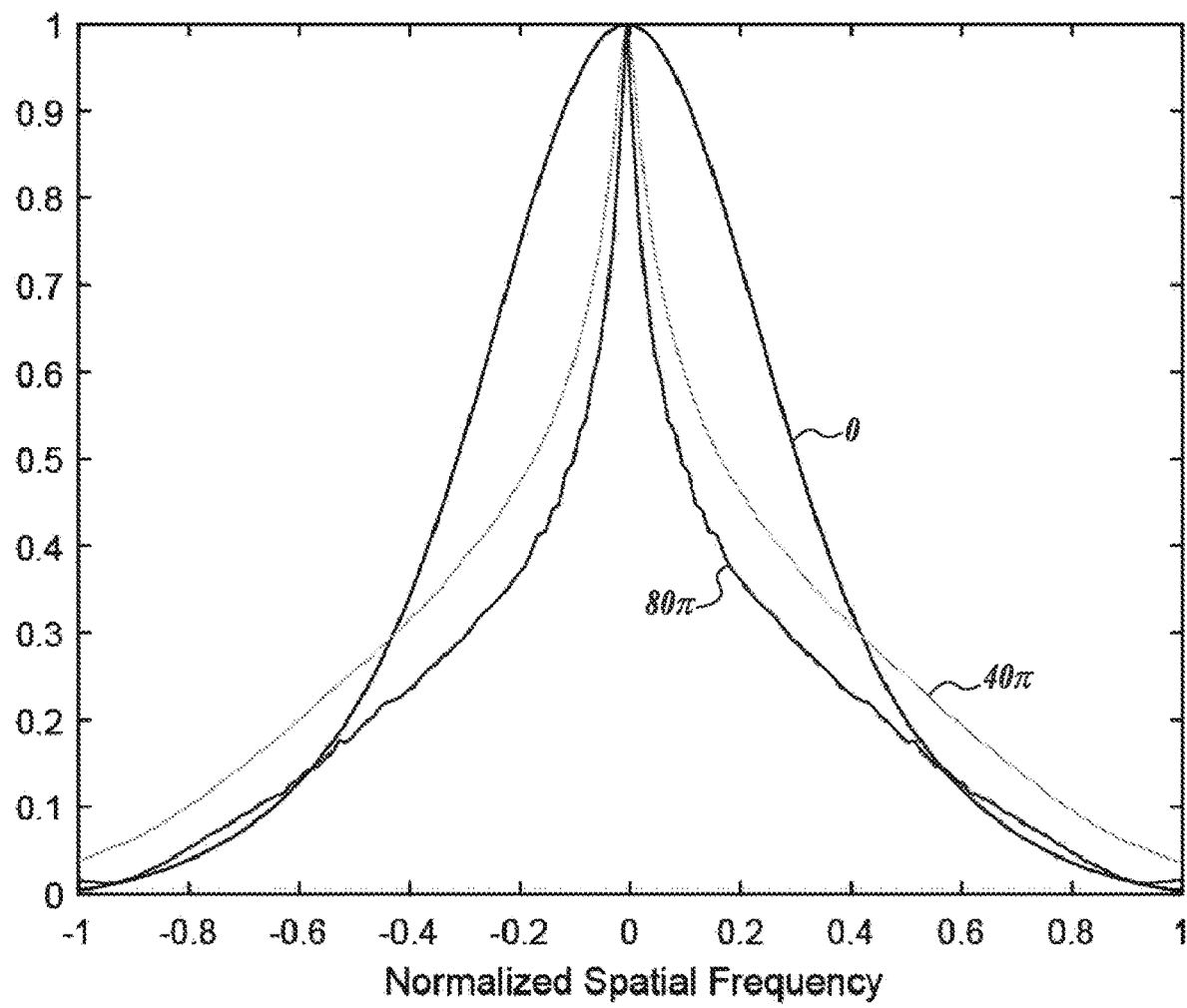

As discussed further herein with respect to the EXAMPLES and FIGS. 10A and 10B, varying the cubic phase strength of the cubic function, such as by increasing a from zero, chromatic aberrations of an image generated by the metasurface may be mitigated. Accordingly, in an embodiment, a is in a range of about 0n to about 200π. In an embodiment, a is in a range of about 20n to about 80π. In an embodiment, a is about 55π. As shown in, for example, FIG. 10A, by varying a, such as increasing a above zero, image quality may improve, such as by reducing chromatic aberrations.

Systems

Figure 8:
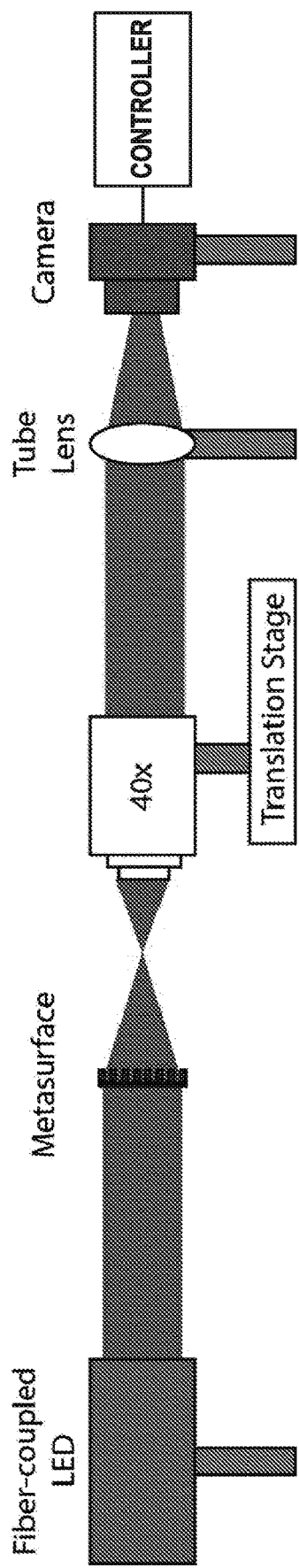
FIG. 8: a system, in accordance with an embodiment of the disclosure. A fiber-coupled LED (Thorlabs M455F1, M530F2, and M625F2) illuminates the metasurface lens under test which focuses light to a plane located at the working distance of a 40× objective (Nikon Plan Fluor, NA=0.75, WD=0.66 mm). A tube lens (Thorlabs ITL200) magnifies and projects the image onto a camera (AmScope MU300).
Figure 9:
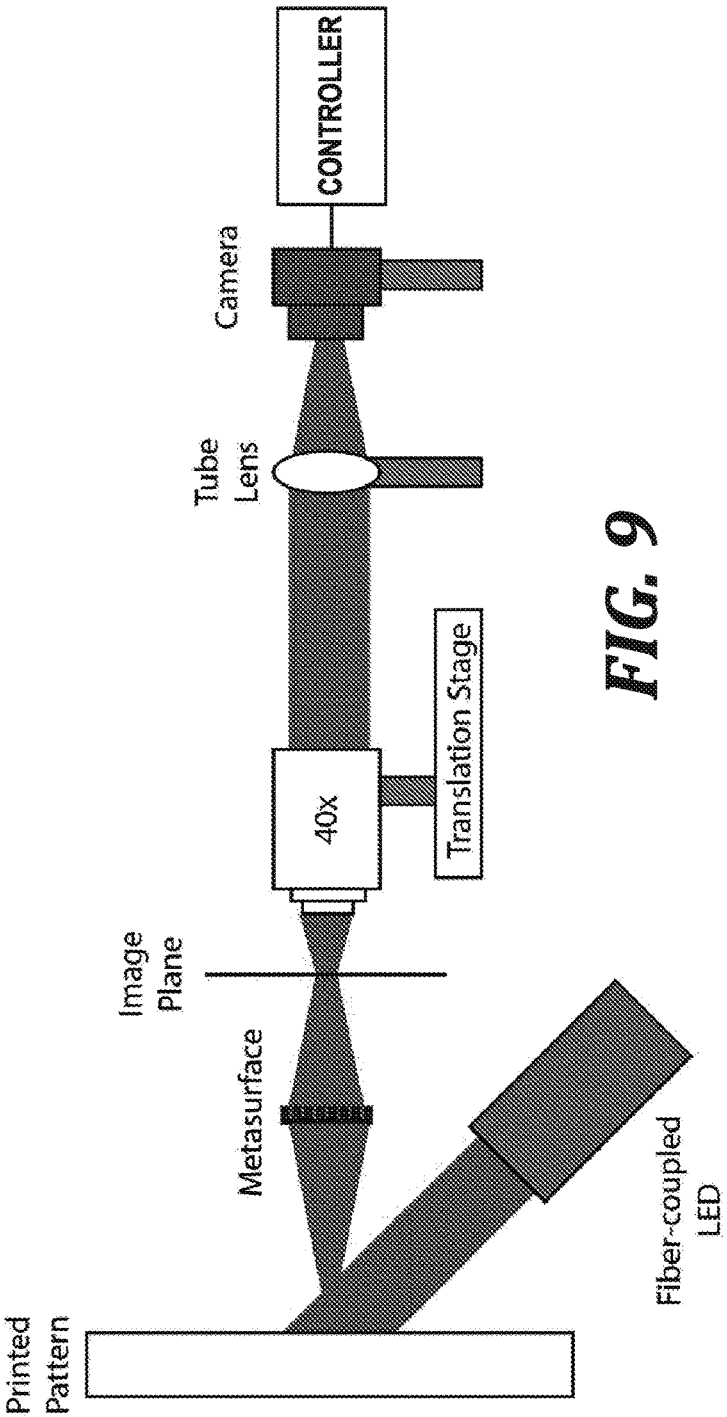
FIG. 9: a system, in accordance with an embodiment of the disclosure. A fiber-coupled LED (Thorlabs M455F1, M530F2, M625F2, and MCWHF2) illuminates an object pattern on standard 8.5"×11" printer paper. The incident LED light scatters off the pattern and is collected and focused by a metasurface lens, producing an image at the working distance of a 40× objective (Nikon Plan Fluor, NA=0.75, WD=0.66 mm). A tube lens (Thorlabs ITL200) then magnifies and projects the image onto a camera (AmScope MU300) from which the result is saved and then deconvolved in software.

In another aspect, the present disclosure provides a system for generating an image. In an embodiment the system includes a metasurface and controller, as shown in FIGS. 8 and 9. In an embodiment, the metasurface is any metasurface as described herein. In an embodiment, the system includes a metasurface having an optical activity over a wavelength range; a photodetector positioned to absorb light that has passed through the metasurface and configured to generate a signal based upon the absorbed light; and a controller operatively coupled to the photodetector.

As discussed above, in an embodiment, such a metasurface can include a plurality of posts comprising a first material having a first refractive index and arranged on a substrate in a square pattern; and interstices between individual posts of the plurality of posts comprising an interstitial substance with a second refractive index less than the first refractive index, wherein a diameter of the posts of the plurality of posts varies rotationally asymmetrically about an optical axis of the metasurface. In an embodiment, the metasurface is configured to focus light in the wavelength range passing through the metasurface in an extended depth of focus where, for example, the extended depth of focus is substantially spectrally invariant over the wavelength range.

In an embodiment, the photodetector is positioned to absorb light from within the wavelength range focused in the extended depth of focus. In this regard, the photodetector is configured to generate one or more signals, such as one or more electrical signals, based upon light in the wavelength range that has passed through the metasurface and has been affected (e.g. focused) by the metasurface.

As above, the controller is operatively coupled to the photodetector, as shown in FIGS. 8 and 9. In an embodiment, the controller is configured to receive one or more signals generated by the photodetector, such as signals based on absorbed light within the wavelength range. In an embodiment, the controller, operatively coupled to the photodetector, includes logic that when executed by the controller, causes the device to perform operations. Such operations can include, for example, operations to process the signals generated by the photodetector to computationally reconstruct the signals. In this regard, the controller may further includes logic to perform operations include generating, with the plurality of computationally reconstructed signals, an image based upon the light absorbed by the photodetector. While the metasurfaces described herein are configured to reduce or mitigate chromatic aberrations of light passing through the metasurfaces, such affects may also generate accompanying increases in signal-to-noise ratios, relative to, for example, a metasurface that is not configured to focus light over an extended depth of focus. Accordingly, operations including computationally reconstructing the plurality of signals to provide a plurality of computationally reconstructed signals may be suitable to computationally reduce signal-to-noise ratios such that images based upon light absorbed by the photodetector are sharper.

Figure 11A:
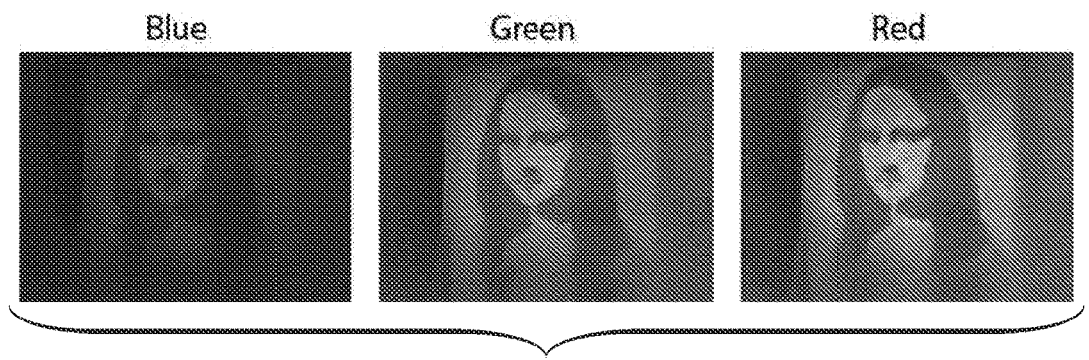
FIGS. 11A-11D: Image quality comparison for different deconvolution methods. Blue, green, and red total-variation-regularized deconvolved images with λ of $10^3$ (A), $5 \times 10^3$ (B), and $10^4$ (C). (D) The same set of images deconvolved using a Wiener filter. Here the images are captured using the α=55π EDOF metasurface lens.
Figure 11B:
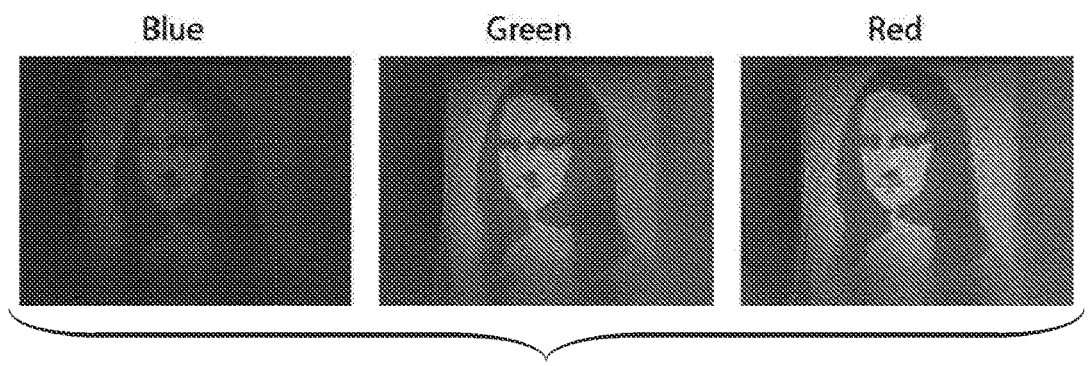
Figure 11C:
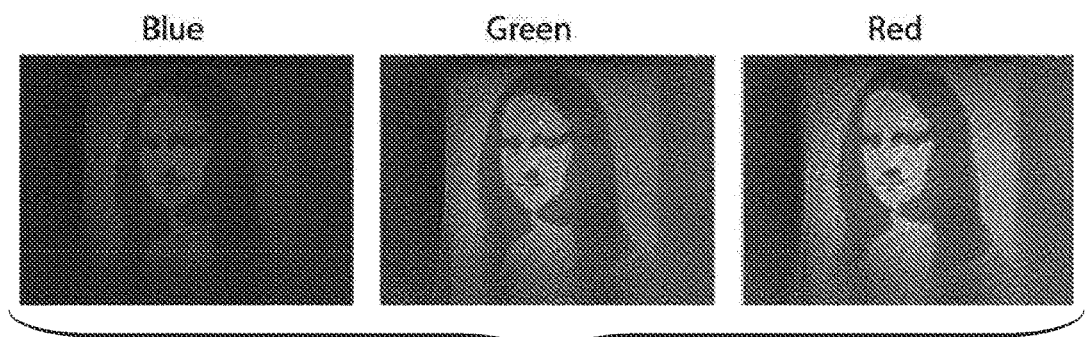
Figure 11D:
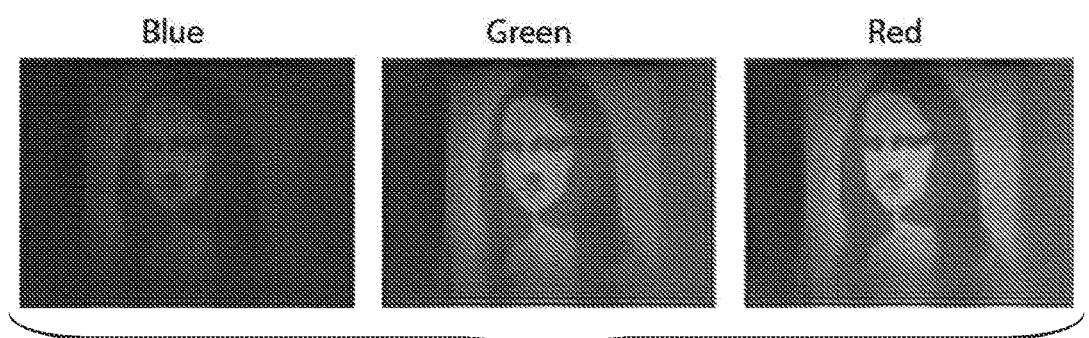

In an embodiment, computationally reconstructing the plurality of signals includes digitally filtering the plurality of signals. Such digital filtration may be suitable to improve quality of an image generated from signals from the photodetector, as shown and discussed further herein with respect to FIGS. 11A-11D. In an embodiment, digitally filtering the plurality of signals includes digitally filtering the plurality of signals with a Wiener filter. See, for example FIG. 11D. In an embodiment, using a Wiener filter includes multiplying a frequency (Fourier) domain equivalent of an image with a function that is determined by a point spread function measured at, for example, one wavelength within the measured wavelength range, such as an average wavelength of the wavelength range. In an embodiment, using a Wiener filter further includes estimating a signal-to-noise-ratio of the system. In this regard, a captured image is converted to a frequency domain via Fourier transform. Such a converted image is multiplied it by the Wiener filter function (determined from the point spread function and the single-to-noise ratio) and then converted back to the Fourier domain to provide a reconstructed image.

In an embodiment, digitally filtering the plurality of signals includes digitally filtering the plurality of signals with total variation regularizer. See, for example FIGS. 11A-11C. Total variation regulizers may be suitable to balance de-noising and de-blurring of an image. This technique can produce higher quality images but generally uses more computation time, as discussed further herein.

In an embodiment, computationally reconstructing the plurality of signals includes deconvoluting the plurality of signals to account for and counteract a deviation of the focusing behavior of the metasurface from ideal lensing of the metasurface. In an embodiment, deconvolution includes deconvolution of the plurality of signals uniformly for each wavelength in the wavelength range, as the metasurface affects alter light across the wavelength range equally. Deconvolution may be suitable to compensate for chromatic and/or other aberrations of the metasurfaces described herein. Computing and/or processing power is generally readily obtained and may be in a relatively small form factor suitable, for example, to be incorporated into systems including the metasurfaces described herein. As discussed further herein, the combination of the metasurfaces of the present disclosure and deconvolution methods described herein may be suitable to replace bulky conventional refractive elements. In an embodiment, the system includes a light source configured to emit light through the metasurface. In an embodiment, the light source is configured to emit light including light in the wavelength range. In an embodiment, the light source is configured to emit light having a wavelength selected from the group consisting of visible light, infrared light, ultraviolet light, and combinations thereof. In an embodiment, the light source includes a plurality of light sources each configured to emit light in different wavelength ranges.

In an embodiment, the light source is positioned to emit light parallel to an optical axis of the metasurface, such as orthogonal to a plane of the substrate, as shown, for example in FIG. 8. In an embodiment, the light source is positioned to emit light at an angle not parallel to an optical axis of the metasurface, as shown, for example, in FIG. 9.

In an embodiment, the system comprises the metasurface as a sole optical element. In an embodiment, the system includes a single metasurface.

In an embodiment, the system includes one or more optical elements in addition to the metasurface. In an embodiment, the system includes a second metasurface, such as a metasurface as described herein. The design principles and materials described elsewhere herein can apply to the second metasurface.

The two metasurfaces may be designed and configured to produce characteristics of an Alvarez lens. In one embodiment, the Alvarez lens is incorporated into a variable focal length laser. In one embodiment, the Alvarez lens is incorporated into a camera. In a further embodiment the camera is a mobile-phone camera. In one embodiment the Alvarez lens is incorporated into a vision-enhancing lens (e.g., glasses).

Such a second metasurface may be configured to move relative to a central optical axis of the metasurface to provide, for example, a non-linear change in focus. In an embodiment, the controller is configured to move, such as with a source of motion, the metasurface and the second metasurface to change an optical power of the combined optical elements.

In an embodiment, the system includes a refractive lens. In an embodiment, an optical axis of the refractive lens is positioned coaxially with an optical axis of the metasurface. As discussed further herein with respect to FIG. 9, a refractive lens, such as a fisheye lens, may be suitable to reduce image quality reduction associated with off-axis imaging in which a central axis of a light source is not collinear with an optical axis of the metasurface.

Methods

In another aspect, the present disclosure provides a method of generating an image with a metasurface and a photodetector. In an embodiment, the metasurface is any metasurface described herein. In an embodiment, the metasurface is part of a system as described herein. As described in the EXAMPLES, images generated with metasurfaces of the present disclosure, such as those focusing light in an extended depth of focus, are suitable to generate an image with fewer chromatic aberrations than, for example, a metasurface focusing light into a narrower focal point. Accordingly, in an embodiment, the metasurfaces suitable for use in the methods of the present disclosure include a plurality of posts comprising a first material having a first refractive index and arranged on a substrate in a square pattern; and interstices between individual posts of the plurality of posts comprising an interstitial substance with a second refractive index less than the first refractive index, wherein a diameter of the posts of the plurality of posts varies rotationally asymmetrically about an optical axis of the metasurface.

In an embodiment, the method includes generating a plurality of signals with a photodetector based on light passed through a metasurface; computationally reconstructing the plurality of signals to provide a plurality of computationally reconstructed signals; and generating, with the plurality of computationally reconstructed signals, an image based upon the light absorbed by the photodetector. As above, in an embodiment, computationally reconstructing the plurality of signals includes digitally filtering the plurality of signals, such as with a Wiener filter. In an embodiment, computationally reconstructing the plurality of signals includes digitally filtering the plurality of signals with a total variation regularizer.

In an embodiment, the method includes deconvoluting the plurality of signals to account for and counteract a deviation of the focusing behavior of the metasurface from ideal lensing of the metasurface.

EXAMPLES

Example 1

The present EXAMPLE describes optical hardware used in conjunction with computational post-processing to realize a full-color imaging system comprising a single metasurface and a computationally inexpensive digital filter which can generate high quality images under broadband white light illumination spanning the whole visible regime.

Results

The 3D point spread function (PSF) of a linear, shift-invariant optical system fully characterizes its behavior. At the image plane of an optical system, the 2D PSF corresponds to an image of a point source with size and shape related to the system's geometry and aberrations. As the wavelength changes, the image plane shifts due to chromatic aberrations, inducing a color-dependent blur in captured images because of the fixed location of the image sensors. For metasurface optics, this focal shift is inversely proportional to the optical wavelength, severely blurring polychromatic images. We mitigate this blur by engineering a metasurface with a PSF which is invariant across the whole visible regime. This has been achieved by coding an optical wavefront using a phase mask to provide an extended depth of focus (EDOF). This EDOF makes the system tolerant to focal shifts due to the preservation of spatial frequency information across the depth of the smeared out focal spot. This comes with the tradeoff of reduced signal-to-noise ratio (SNR) and blurring of the captured image as incident light is spread over a greater volume; however, unlike a simple lens which has wavelength-dependent blur, an EDOF system can have spectrally invariant blur over a wide frequency band, the bandwidth of which increases with the depth of focus. The spectral invariance of the induced blur enables post-processing with a single wavelength-independent filter to retrieve a high-quality image.

Figure 1C:
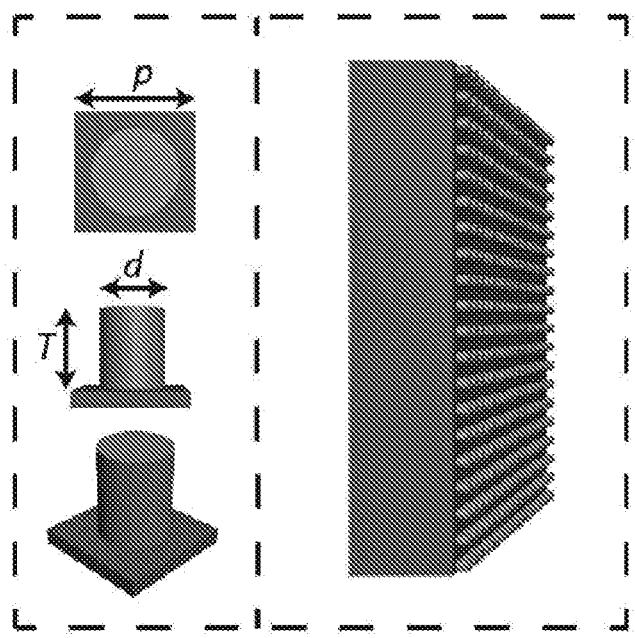
Figure 1C:
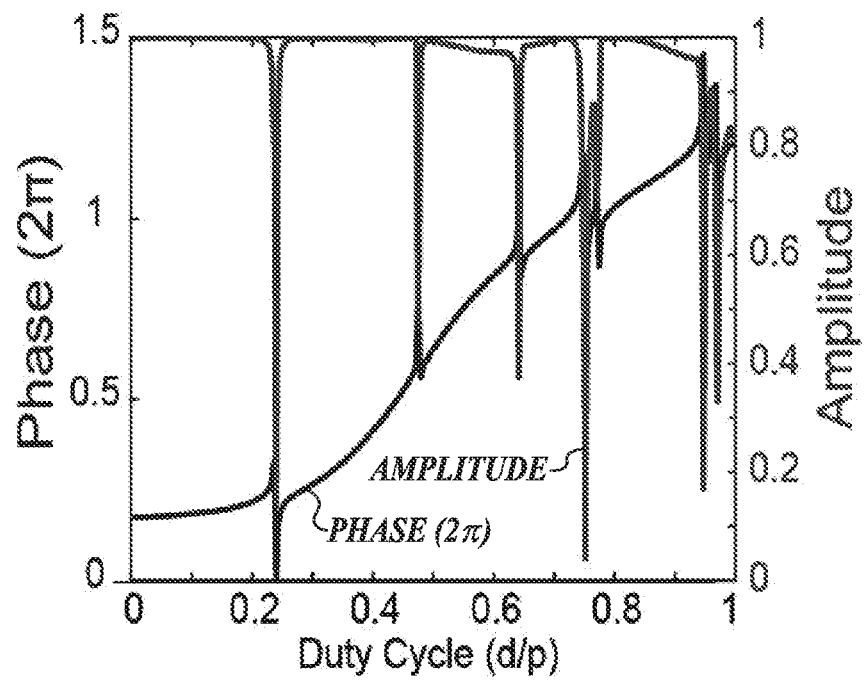
Figure 1D:
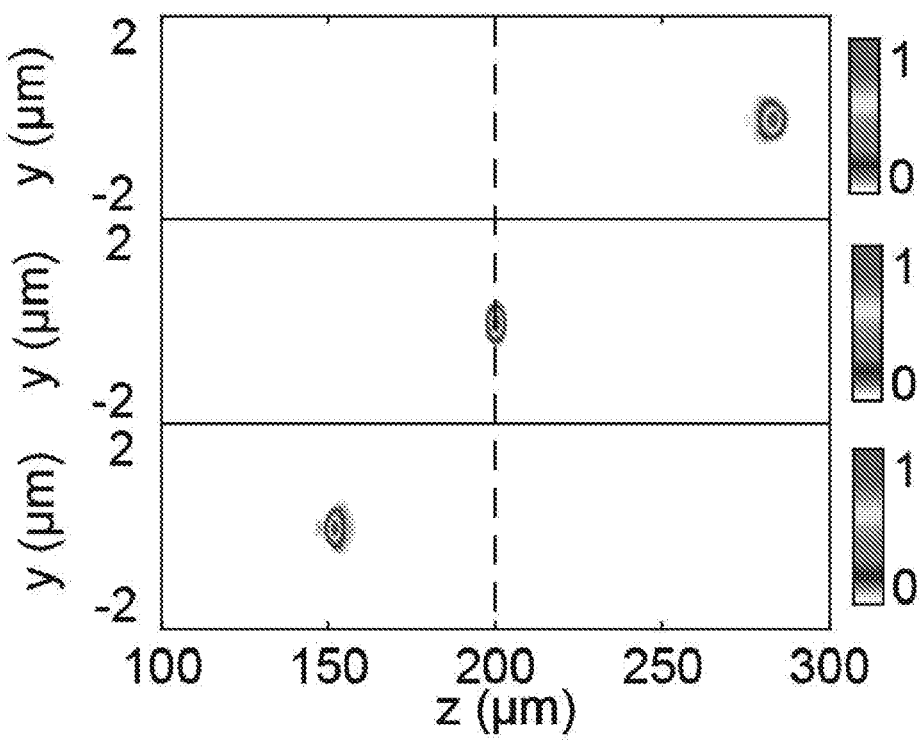
Figure 1E:
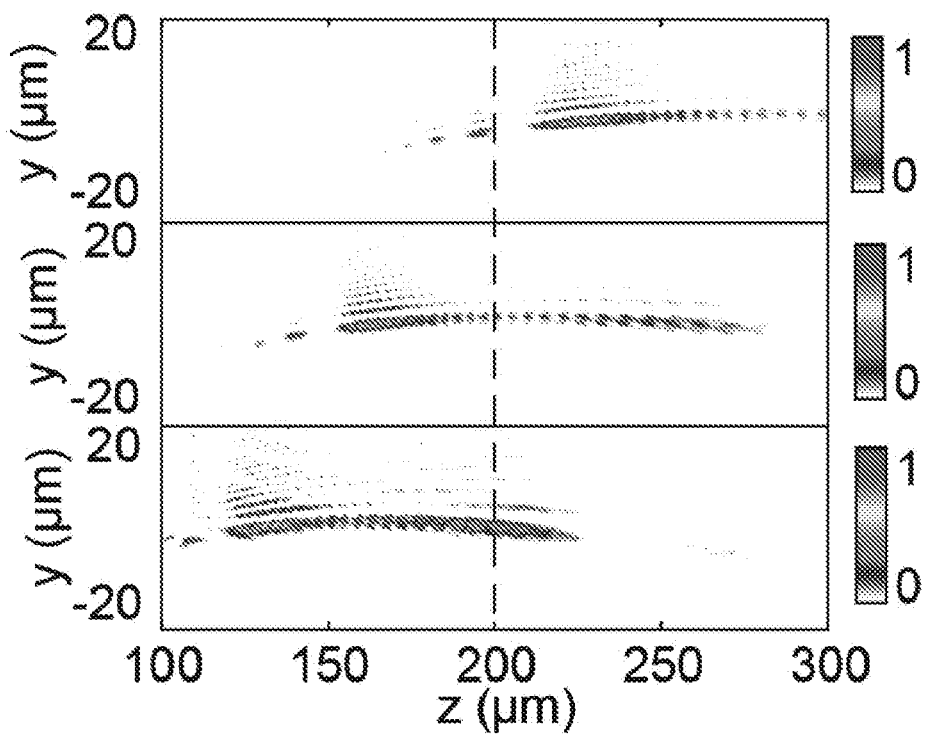
Figure 1F:
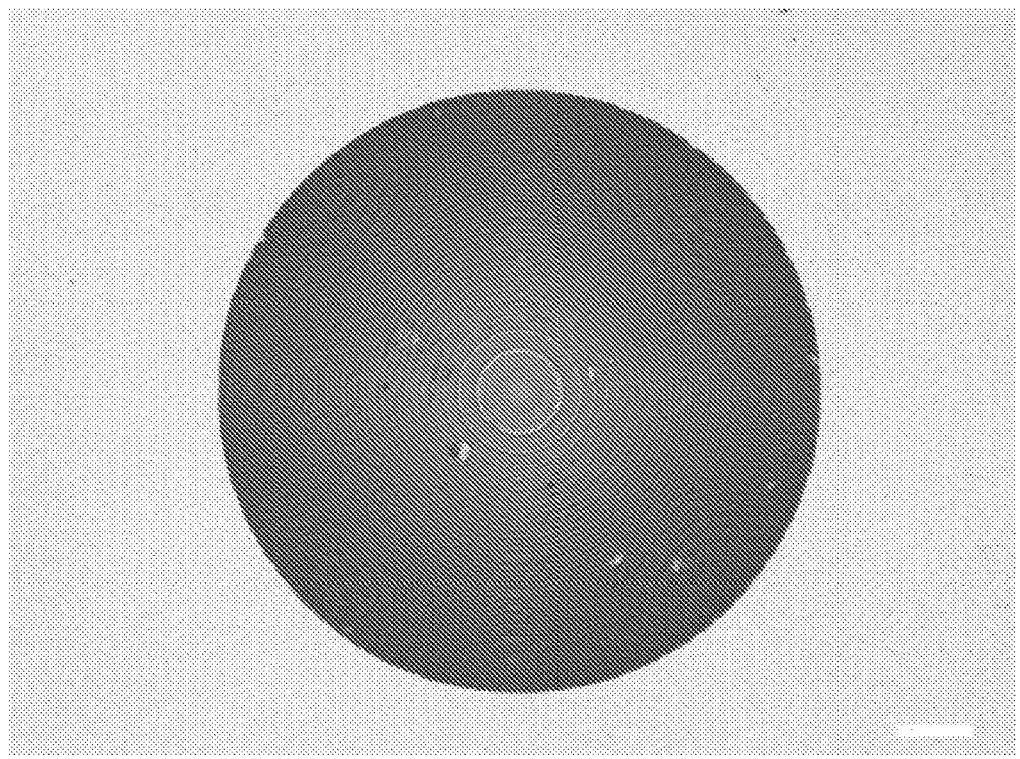
Figure 1G:
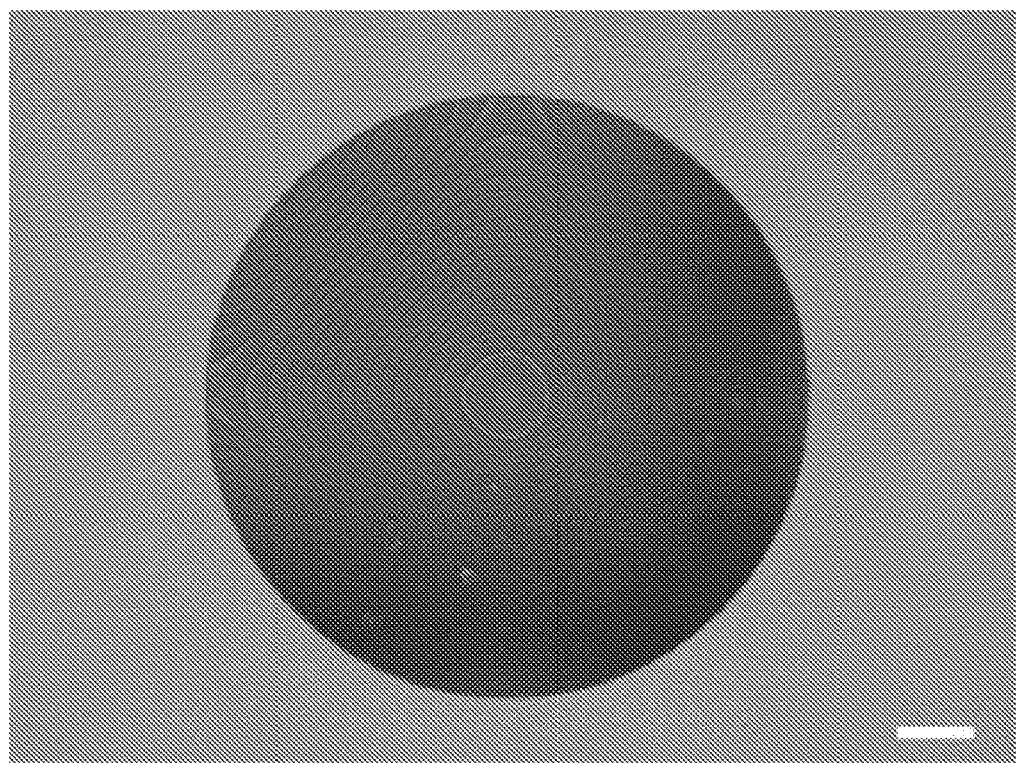
Figure 2A:
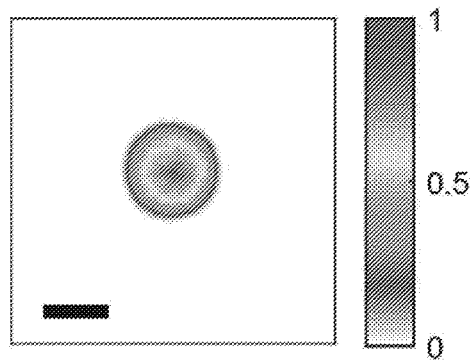
FIGS. 2A-2H: Characterization of the imaging metasurfaces. The point spread functions (PSFs) of the singlet metalens (top row) and extended depth of focus lens (bottom row) were measured under blue (A and E), green (B and F), and red (C and G) illumination conditions. The scale bars are of length 25 µm. The modulation transfer functions (MTFs) were also calculated for both designs (D and H). In both D and H, a normalized frequency of 1 corresponds to the same cutoff frequency of 579 cycles/mm.
Figure 2B:
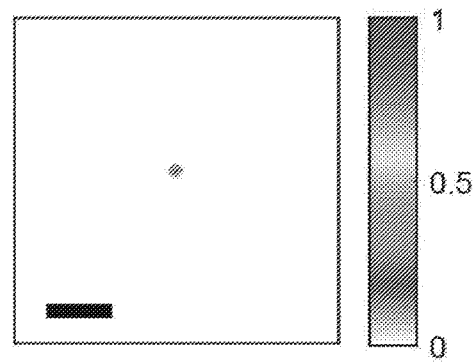
Figure 2C:
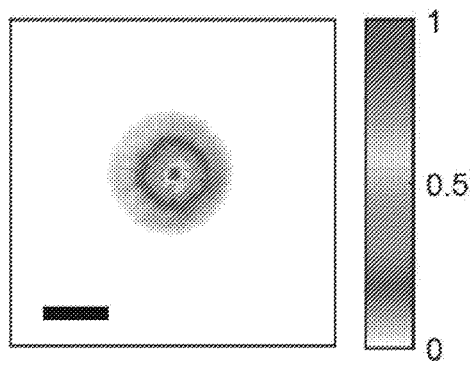
Figure 2D:
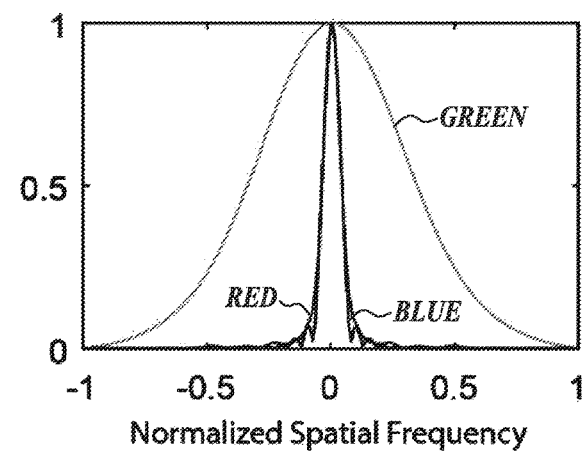
Figure 2E:
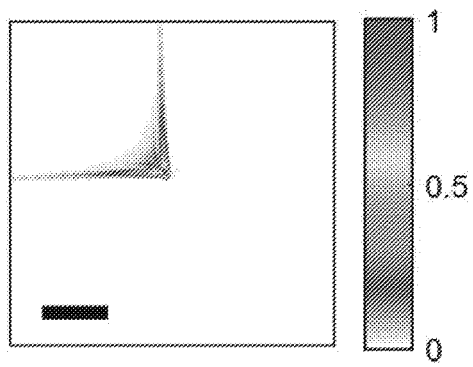
Figure 2F:
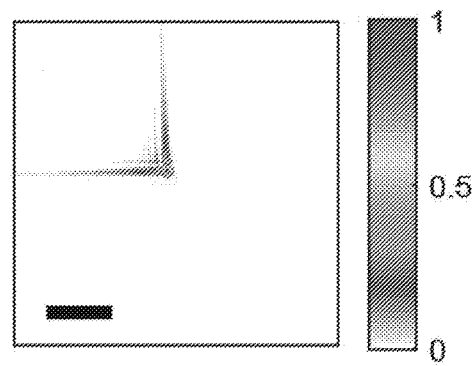
Figure 2G:
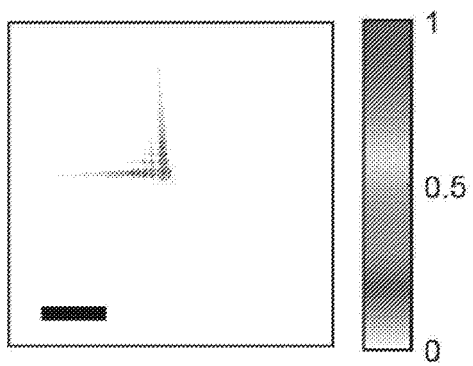
Figure 2H:
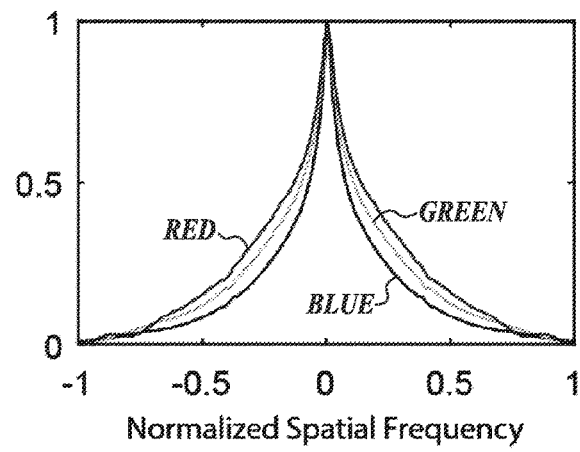

The requirement of a secondary phase mask for wavefront coding increases the system's size and complexity. Furthermore, these phase masks are often freeform in nature (i.e., characterized by rotational asymmetry or higher order polynomials) and are challenging to fabricate by traditional means such as diamond turning and multi-stage lithography for making diffractive elements. With the flat nature of metasurface-based systems, however, we can convert a freeform element to a compact and uniform thickness device using a single lithography stage. This design freedom also enables combining the lensing and wavefront coding functionalities into a single element. A variety of different wavefront coding masks can produce an EDOF. Typically, these masks will produce non-diffracting beams over a wide range and in conjunction with a lens can generate an elongated focus. Cubic functions are a common choice because of their simplicity and rectangular separability. Furthermore, it can be shown via the stationary phase method applied to an ambiguity function representing an optical transfer function, that for a phase mask which is a monomial, the modulation transfer function is insensitive to misfocus (e.g., chromatic focal shift) if and only if the mask function is cubic. Owing to this wavelength insensitivity and their widespread usage in extended depth of field systems, we have elected to use a cubic phase term in this work as well. Here, we design a single element capable of simultaneously focusing light and coding the wavefront to increase the depth of focus with phase of the form below:

$$\varphi = \frac{2\pi}{\lambda}(\sqrt{x^2 + y^2 + f^2} - f) + \frac{\alpha}{L^3}(x^3 + y^3)$$

where x and y are the in-plane coordinates, $\lambda$ the operating wavelength, f the nominal focal length, L half the aperture width, and $\alpha$ signifies the extent of the cubic phase. We designed two metasurfaces: one with $\alpha=0$, which is a simple lens, and one with $\alpha=55\pi$, which has an EDOF. Both devices had a nominal focal length of 200 µm at 550 nm. Our devices consist of cylindrical silicon nitride nanoposts of thickness 633 nm on top of a silicon dioxide substrate (FIGS. 1A and 1B) positioned on a square lattice with a period of 400 nm. Our choice of nanoposts, as opposed to nanofins or V-shaped antennas, enables polarization-independent behavior, while the high bandgap of silicon nitride enables transparent operation and high efficiency across the visible band. Each nanopost mimics a truncated waveguide with low reflectivity top and bottom interfaces which induce low quality factor resonances. Incident light couples into modes supported by the nanoposts, which then shift the phase of the light before coupling the light to a transmitted free-space mode. By adjusting the diameter, the modal structure supported by the nanopost can vary, changing the modes' ensemble behavior and inducing different phase shifts. Due to our interest in broadband visible regime operation (400-700 nm), we selected a central nominal design wavelength of 550 nm for our nanoposts. We simulated the transmission coefficient as a function of post diameter via rigorous coupled-wave analysis (RCWA) (FIG. 1C). The transmission coefficient exhibits more than a $2\pi$ change in phase and uniform amplitude over a wide range. In designing our metasurfaces, we used a set of 10 different phase steps between 0 to $\alpha$ and avoided drops in amplitude by selecting diameters off the resonance dips. We simulated both metasurfaces to analyze their performance as a function of wavelength. FIGS. 1D and 1E show the chromatic focal shift for the $\alpha=0$ and $\alpha=55\pi$ designs respectively, in which the dashed black lines indicate the desired focal plane. We see that while only green light (550 nm) is in focus for $\alpha=0$, all simulated wavelengths impinge on the desired plane as part of an EDOF for $\alpha=55\pi$. We fabricated the metasurfaces using electron-beam lithography and dry etching. FIGS. 1F and 1G show optical images of the final devices. The fabricated $\alpha=0$ and $\alpha=55\pi$ lenses demonstrate average measured focusing efficiencies of 63% and 57% respectively for the wavelengths tested, comparable to existing visible wavelength metalenses. Hereafter, we denote the $\alpha=0$ metasurface as the singlet metalens and the $\alpha=55\pi$ metasurface as the EDOF metalens.

Our computational imaging system poses a problem of the matrix form f=Kx+n, where the desired image x has been blurred by the system kernel K and corrupted by noise n to produce the captured image f. A variety of different methods is available for estimating x, such as the linear Wiener filter or regularized optimization-based approaches. For this work, we chose the Wiener filter due to its low computational complexity. Moreover, the reconstructed image quality is comparable to that of more advanced deconvolution methods. We obtain the kernel K, as required for filtering the image, by a calibration PSF measurement. We measured the PSFs and calculated the modulation transfer functions (MTFs) for both the singlet and EDOF metalenses for red (625 nm), green (530 nm), and blue (455 nm) LED illumination (FIGS. 2A-2H). For the singlet, the tightly focused spot with green illumination differs drastically from the large blurs under red and blue illumination, translating to the strong distinction in the MTFs under these illumination conditions. With this design, the zeros in the MTFs for red and blue wavelengths result in an unrecoverable loss of spatial frequency information and preclude computational reconstruction. For the EDOF metasurface, however, not only are the MTFs wavelength-invariant, but they also have no zeros until the cutoff spatial frequency. The preservation of this spatial frequency content enables computational reconstruction to retrieve the desired image x.

Figure 3A:
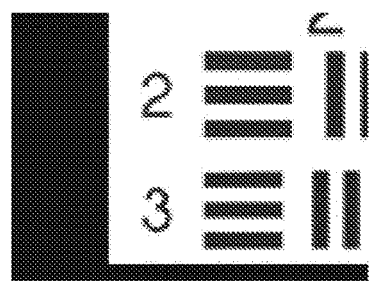
FIGS. 3A-3H: Imaging at discrete wavelengths. The appropriately cropped original object patterns used for imaging are shown in (A) and (B). Images were captured of the 1951 Air Force resolution chart with the singlet metalens (C) and the extended depth of focus (EDOF) lens without (D) and with deconvolution (E). Images were also taken of a binary Mona Lisa pattern with the singlet metalens (F) and the EDOF device without (G) and with (H) deconvolution. The scale bars are of length 20 µm.
Figure 3C:
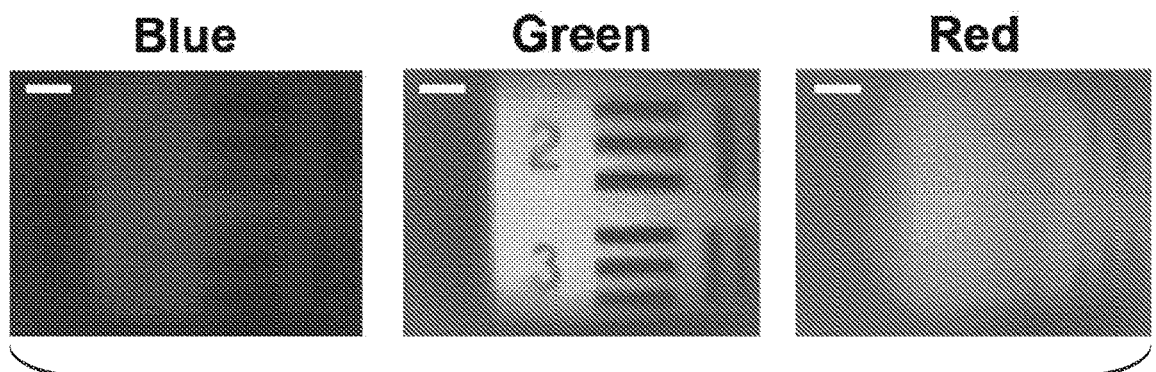
Figure 3D:
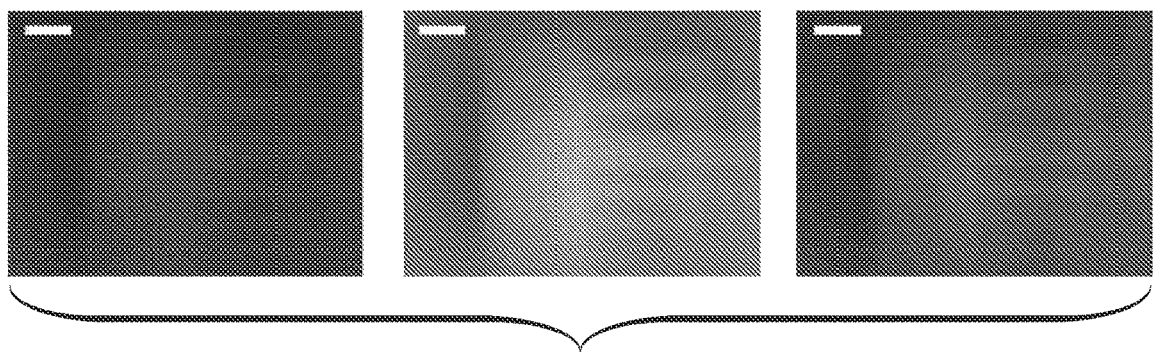
Figure 3E:
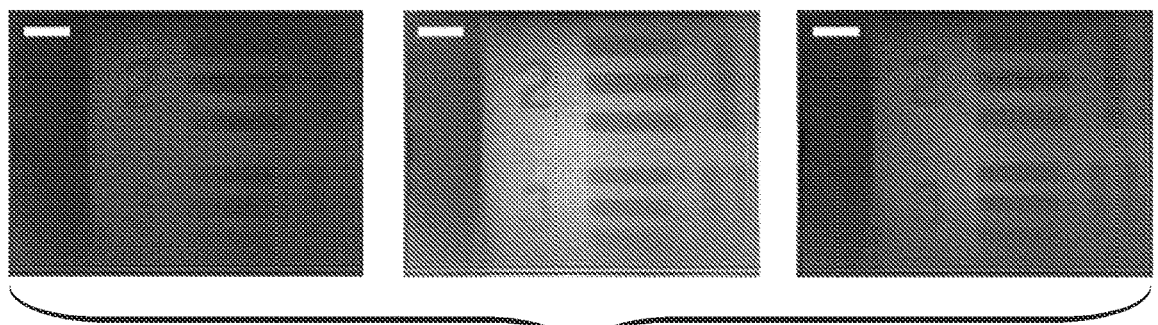
Figure 3B:
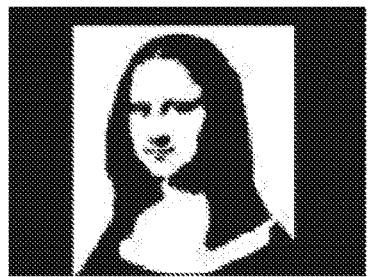
Figure 3F:
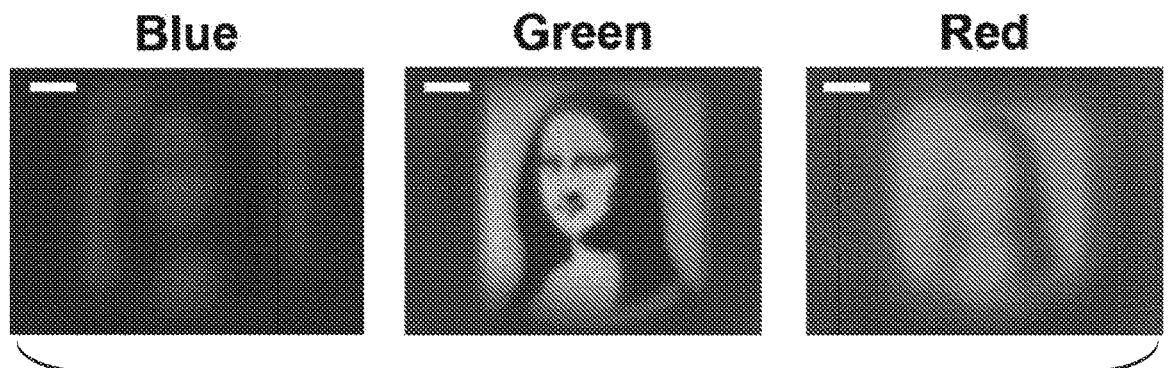
Figure 3G:
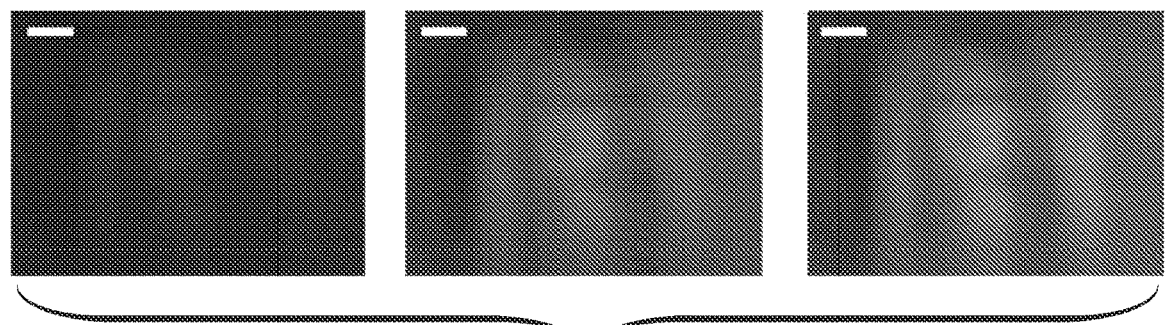
Figure 3H:
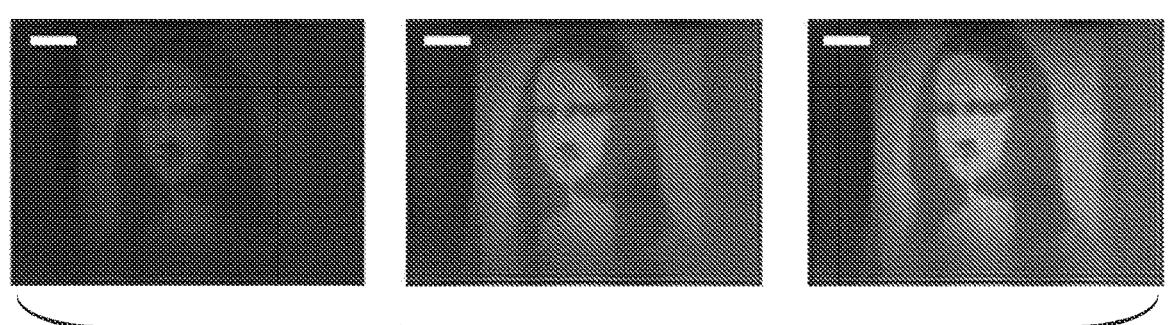

To demonstrate the imaging capability of the system, we illuminated patterns on standard printer paper at object distances much greater than the focal length, on the order of a few centimeters. The metasurfaces would then form images by focusing down the scattered light. We first examined narrowband (~30 nm bandwidth) imaging performance, under separate red (625 nm), green (530 nm), and blue (455 nm) illumination with LEDs. FIGS. 3C-E compare the captured images of a portion of the 1951 Air Force resolution chart (FIG. 3A) by the singlet lens to those by the EDOF lens with and without deconvolution. While the pattern is in focus for green light, upon switching to blue or red illumination, the images captured via the singlet undergo severe distortion. For the EDOF lens without deconvolution, the image is blurry at all wavelengths, but the blur appears uniform across wavelengths. With post-capture deconvolution, however, the resulting images appear in focus for all wavelengths, providing a substantial performance improvement with greatly reduced chromatic aberrations relative to those of the singlet. We quantified this performance improvement in terms of the structural similarity (SSIM) of the Air Force pattern images. The deconvolved EDOF system's images had a SSIM 0.209 higher compared to those of the $\alpha=0$ system. We also imaged more complex patterns, including a black and white binary Mona Lisa pattern (FIGS. 3B and 3F-H) and also observed mitigation of the chromatic aberrations using the EDOF lens. While the SNR of our deconvolved images is lower compared to that of the in-focus green images with the singlet metalens, our system exhibits in-focus images over a broad wavelength range. In conjunction with computational algorithms optimized for low-light imaging scenarios comparable to our experimental setup, imaging performance can be further improved.

Figure 4A:
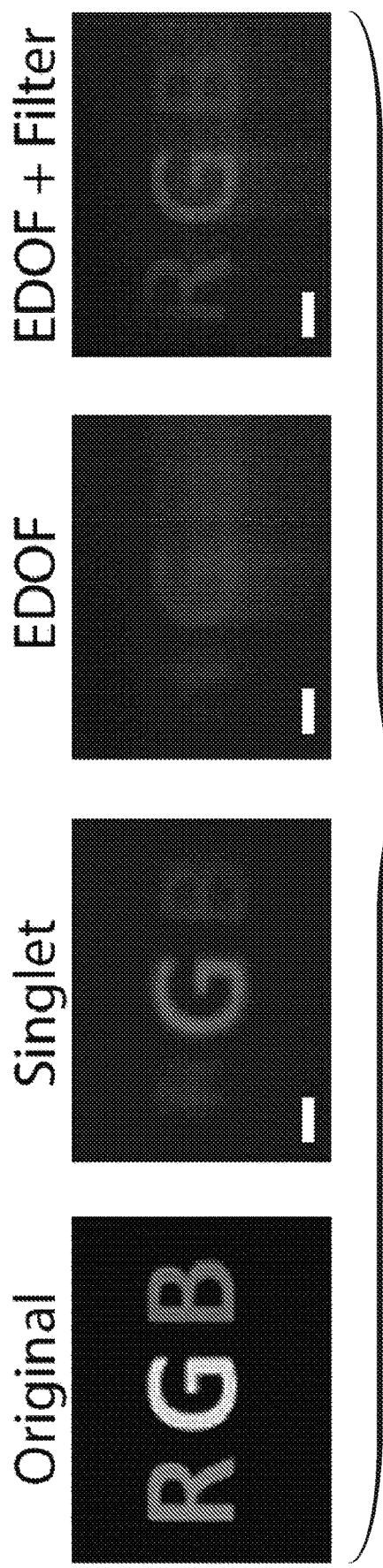
FIGS. 4A-4D: Imaging with white light. Images were taken under white light illumination of color printed RGB (A) and ROYGBIV (B) text, a colored rainbow pattern (C), and picture of a landscape (D) with a blue sky, green leaves, and multicolor flowers. The appropriately cropped original object patterns used for imaging are shown in the left column. The scale bars are of length 20 µm.
Figure 4B:
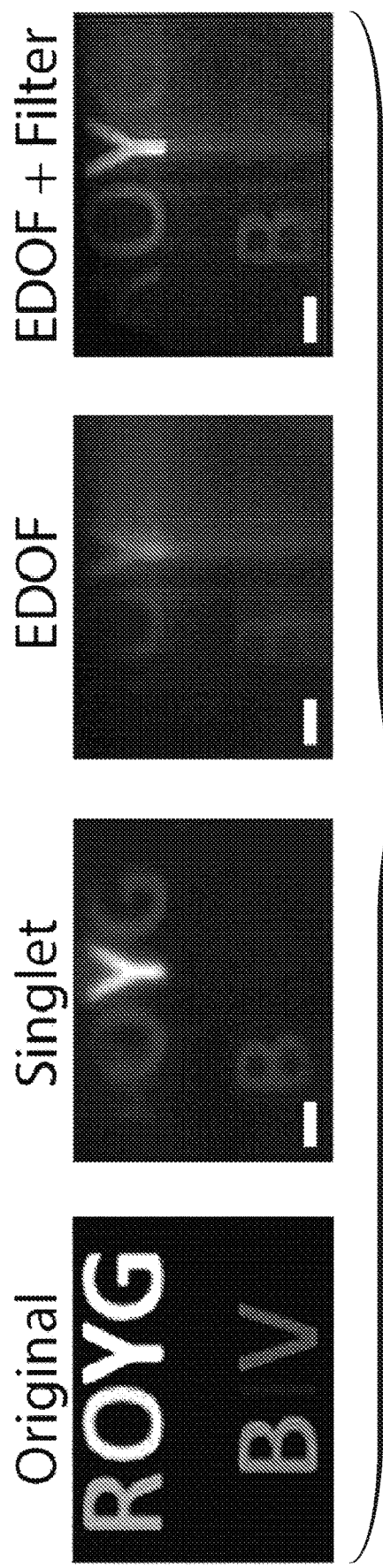
Figure 4C:
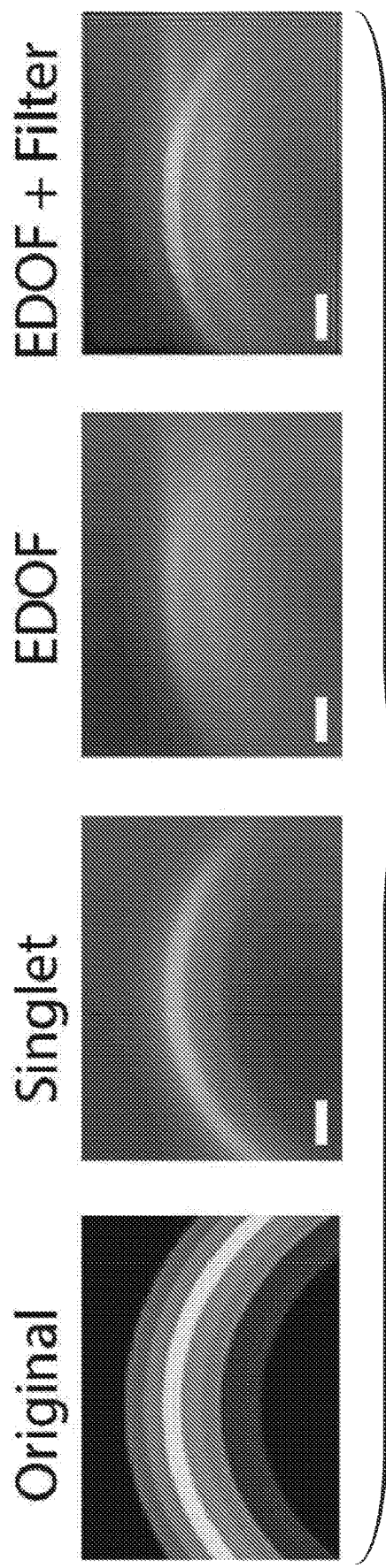
Figure 4D:
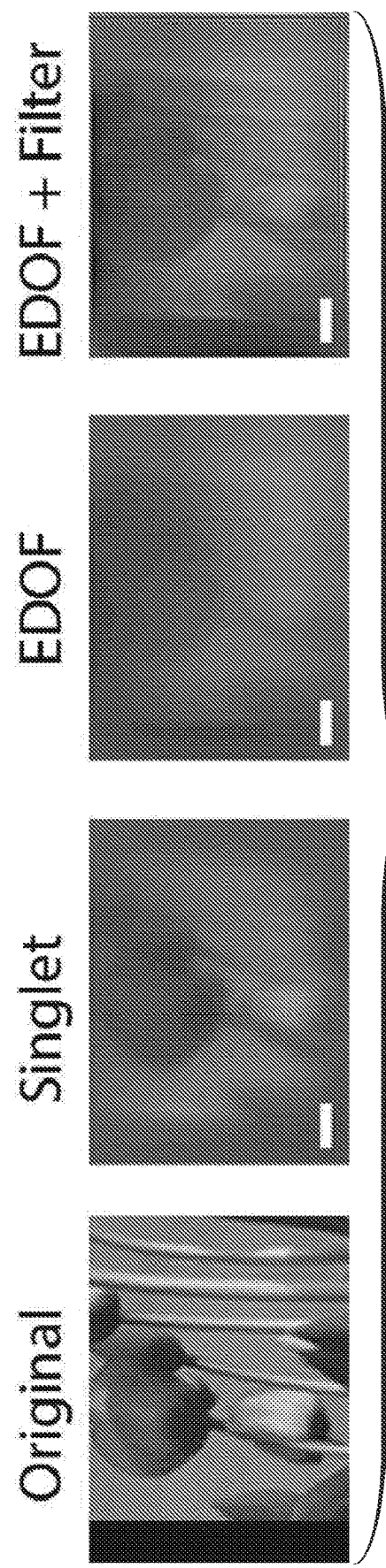

Finally, we tested the system under broadband illumination using a white light source (FIGS. 4A and 4B). Under this condition, the singlet lens significantly blurred color printed RGB text (FIG. 4A), with noticeably better image quality for the green letter G as the lens was positioned to be in focus for green light. FIG. 4A also shows the spectrally uniform blurring of RGB text formed by capturing the same object pattern with the EDOF lens. After deconvolution, we can clearly make out each individual character, whereas the blue B is blurry and the red R is unintelligible in the image captured directly with the singlet lens. The deconvolved images do exhibit some erroneous horizontal and vertical lines arising from the asymmetric shape of the PSF, which can produce directional artifacts, but these can be corrected by more advanced deconvolution as well as by using a rotationally symmetric PSF. FIG. 4B demonstrates a similar image quality improvement for ROYGBIV text, where the characters are substantially blurred by the singlet metalens, but are in focus after capturing with the EDOF device and deconvolution. For the case of a rainbow pattern (FIG. 4C), the chromatic blur induced by the singlet lens obscures individual color bands and the green stripe is barely evident, whereas the deconvolved EDOF image clearly shows separate bands and edges. For a landscape image (FIG. 4D) with multicolor flowers and leaves, stem and leaf structures severely blurred by the singlet are in focus and color ringing artifacts in the blossoms are reduced in the deconvolved EDOF image.

Discussion

Compared to metasurface designs where the achromatic bandwidth is narrow or discrete wavelength images are superposed to produce a color image, to the best of our knowledge, we are the first to demonstrate in-focus full visible spectrum imaging with white light directly. We observe this behavior in FIGS. 4A-4D, where when a single image is captured we have not only red, green, and blue light in focus after deconvolution, but also intermediate colors, such as yellow, orange, and violet. Furthermore, our metalenses rely on simple transmissive scatterers which could be extended to use a variety of different geometries and materials, whereas existing broadband achromatic metalenses require scatterers with carefully designed dispersion characteristics. With our system, however, while the digital filter in conjunction with our modified phase mask enables broadband color imaging, the required post-processing complicates the system and introduces a delay time to deconvolve the captured image. For many photography and video applications this would not pose an issue as any captured frames could be saved and then deconvolved offline. For real-time imaging, our system would also work as our filter relies on the O(N log N) fast Fourier transform algorithm, which can be accelerated via FPGAs or GPUs. Such hardware acceleration techniques would require additional circuitry and increase system complexity, requiring the designer to balance the system's requirements and costs for the given application. Our implemented system also suffers from a limited space-bandwidth product arising from our small (200 µm) focal length and aperture width. Typically, the space-bandwidth product of an optical system will decrease as the system dimensions are scaled down, reducing the information capacity and number of resolvable points in an image. The small aperture of our metalenses also limits light collection, which reduces the SNR and necessitates higher incident power or increased exposure time. These limitations, however, are not inherent to our hybrid optical-digital system, but instead they arise from our short focal length and would be present in any implementation at the same length scale.

The reported system combines computational imaging and an EDOF metasurface with a NA~0.45 to image full visible spectrum object patterns with minimal chromatic aberrations, making our devices well-suited for microscopy, hyperspectral imaging, and ultra-thin cameras. To the best of our knowledge, we have also imaged with the shortest focal length metasurface to date with more than a 2.4× reduction in focal length compared to the shortest value previously. While this system must contend with geometric aberrations, these can be circumvented by further co-optimization of the optical element (e.g., by stacking metasurfaces) and post-processing algorithms. In combining optical metasurfaces and computational imaging, this work provides a model for designing hybrid systems where the optical hardware and software together generate high quality images while minimizing system size and complexity.

Effect of the Cubic Phase Strength a on Image Quality

We analyzed the effect of the $\alpha$ parameter on image quality as there is a tradeoff between the depth of focus and the signal-to-noise ratio (SNR) of resultant images. We fabricated a set of EDOF metasurfaces with a wide range of a values. FIG. 10A shows a set of white light images captured and deconvolved using four lens designs with different $\alpha$ values. While the $\alpha=0$ design has apparent color ringing in the tulips image, distortion in the RGB and ROYGBIV texts, and edge blurring in the rainbow pattern, these artifacts are mitigated when imaging and deconvoluting with nonzero $\alpha$. For $\alpha=20\pi$, we see the highest intensity in-focus images; however, there are still some chromatic aberrations evident in the tulips image with the long stem structures which should be yellow, but appear green. Transitioning to higher $\alpha$, there is a noticeable drop in intensity, albeit some of the ringing artifacts are reduced and the tulip stems appear uniformly yellow. FIG. 10B compares the green light modulation transfer functions (MTFs) for lenses of three different $\alpha$ values, demonstrating a reduction in SNR for a given wavelength. The reduction in SNR is evident from the lower value of the MTF at higher $\alpha$. As the MTF relates how efficiently spatial frequency information can be transferred from an object to an image, the lower MTF translates to lower SNR. Here, the $\alpha=0$ lens is positioned to be focused for green light, providing a broad MTF; however, if it were illuminated with a wavelength far away from this design wavelength, we would see a substantially narrowed MTF with zeros in its spectrum as in FIG. 2D.

Image Comparison for Different Deconvolution Methods

In addition to using Wiener deconvolution, we also tested more advanced post-processing algorithms for our system, such as optimization using a total variation (TV) regularizer. The optimization problem is as below $$x = \mathrm{argmin}_x\ TV(x) + \frac{\lambda}{2}\|Kx - f\|_2^2$$

where TV denotes the total variation regularizer, K is the measured kernel, f is the unmodified captured image, A is a parameter which controls the balance between noise reduction and deconvolution, and x is the latent image. We performed this optimization using an open source code which solves the problem using the split Bregman method. Our images would typically converge to a solution after approximately 20 iterations, which took 55.5 seconds on average for a single image. With our Wiener filter, however, the image quality was comparable and took a mere 0.56 seconds per image on average, representing a speedup of two orders of magnitude. FIGS. 11A-11D present images deconvolved using both methods, showing the effect of the λ parameter on noise and image sharpness for the TV-regularized method. With lower λ, the deconvolved images had less noise, but had edges which were less sharp. Increasing λ, the edges became more pronounced, but noise also became more prominent. While the TV-regularized approach yielded decent quality images and provided fine-tuned control of noise and smoothness, we found that the simplicity and relative speed of the linear Wiener filter with its comparable image quality justified its use.

Assessing Chromatic Invariance by Structural Similarity of Images

To assess the level of invariance between images captured with our designed full-color system under different illumination wavelengths, we needed a quantifiable metric for comparison. A standard technique for assessing image quality, evaluating a test image with respect to a reference "perfect" image is the structural similarity (SSIM). This metric uses a weighted combination of luma, contrast, and structure component functions based on calculations of the mean, variance, and covariance ($\sigma_{xy}$) in the x ($\mu_x$, $\sigma_x^2$) and y ($\mu_y$, $\sigma_y^2$) directions of the image. The formula used for our calculation is shown below $$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $c_1=(k_1L)^2$, $c_2=(k_2L)^2$, L is the dynamic range of pixel values, $k_1=0.01$, and $k_2=0.03$. A SSIM of 0 would mean zero similarity, whereas a SSIM of 1 means the test image exactly matches the reference. We calculated the SSIM for the case of our Air Force test chart image of FIGS. 3A, 3C, 3D, and 3E. Here, to capture the notion of chromatic aberration, we were interested in looking at how similar images appear when illuminated by far-separated wavelengths. To test this, we compared the blue light captured image with the α=0 lens (FIG. 3A) to its red light captured image, treating the red light image as the reference. This calculation yielded a SSIM of 0.748. We repeated this calculation for the images of FIG. 3C, comparing the EDOF-captured and deconvolved blue light image to its red reference image. This case gave a SSIM of 0.956, a substantial 0.209 improvement in the SSIM, indicating that with the EDOF lens and deconvolution, we can achieve images which exhibit much-reduced chromatic aberration as compared to a singlet metasurface system.

Comparison of Theoretical and Experimental MTFS with Nonzero Source Bandwidth

Figure 12:
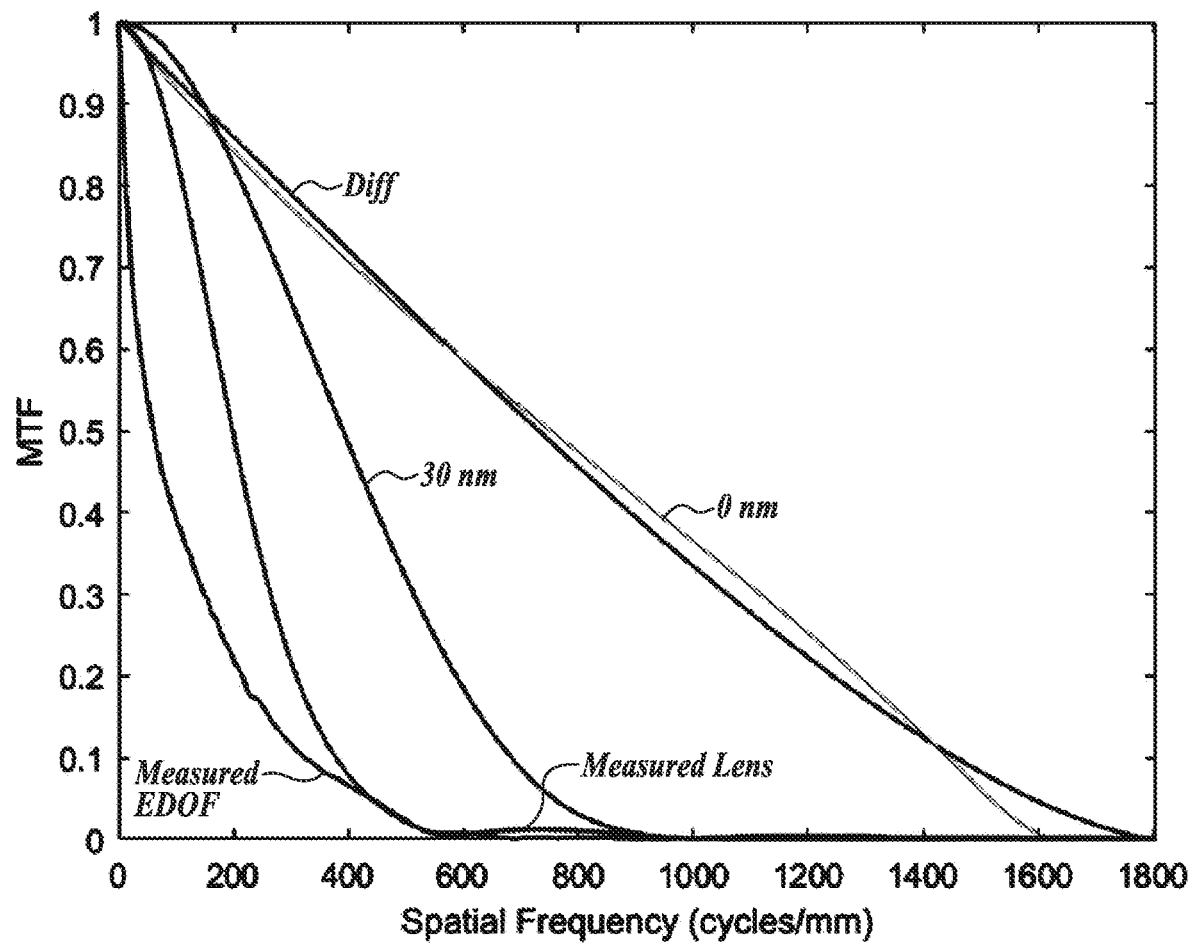
FIG. 12: Comparison of theoretical and experimental MTFs with nonzero source bandwidth. MTFs are shown for the analytical diffraction-limited solution of a singlet lens (Diff), a simulated phase mask illuminated with 0 nm ("0 nm") and 30 nm ("30 nm") bandwidth sources, and the measured fabricated singlet ("Measured Lens") and EDOF ("Measured EDOF") metalenses, which were illuminated with a green LED of ~30 nm bandwidth (Thorlabs M530F2) and positioned to be in focus at this wavelength.
Figure 13A:
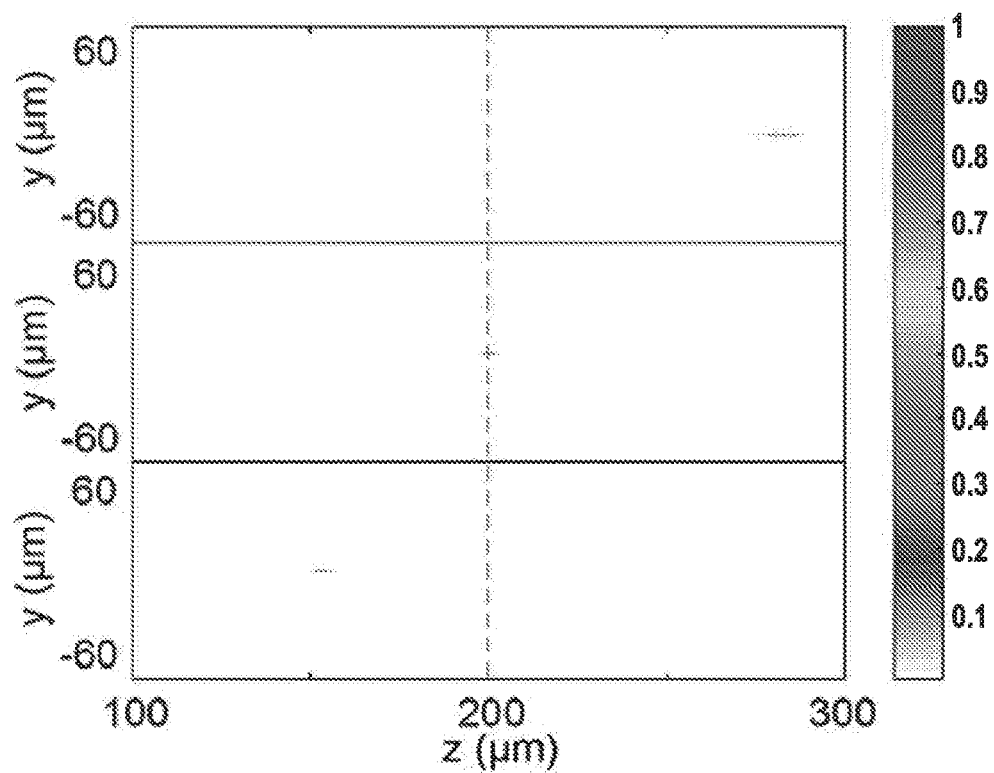
FIGS. 13A-13F: Simulated off-axis performance of the singlet and EDOF metalenses. Simulated intensity cross sections along the optical axis of the singlet (EDOF) metalens are shown on the left (right). Incident angles of 0° (A and B), 5° (C. and D), and 10° (E and F) are shown. In each figure, simulation wavelengths of 400 nm, 550 nm, and 700 nm are used going from top to bottom.
Figure 13B:
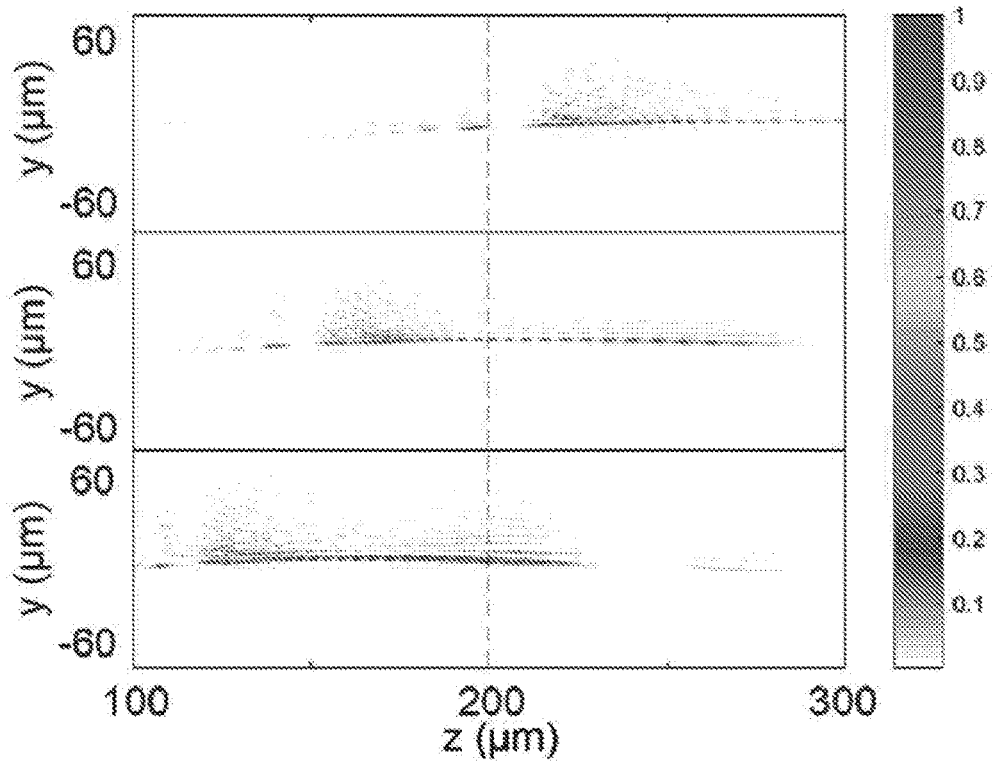
Figure 13C:
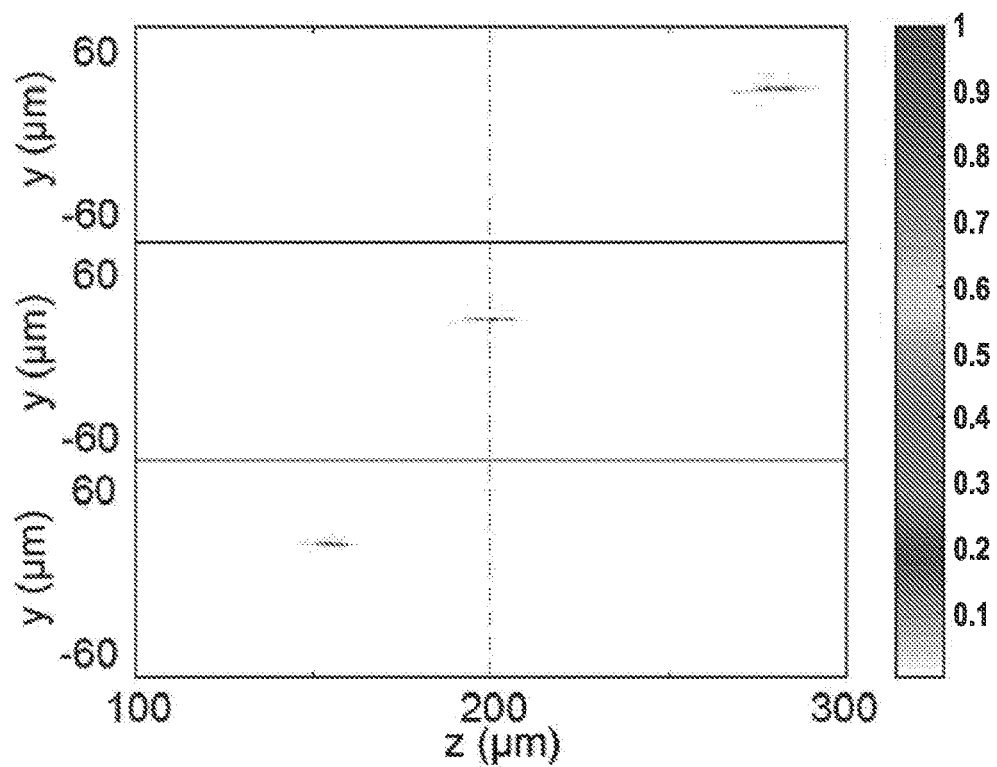
Figure 13D:
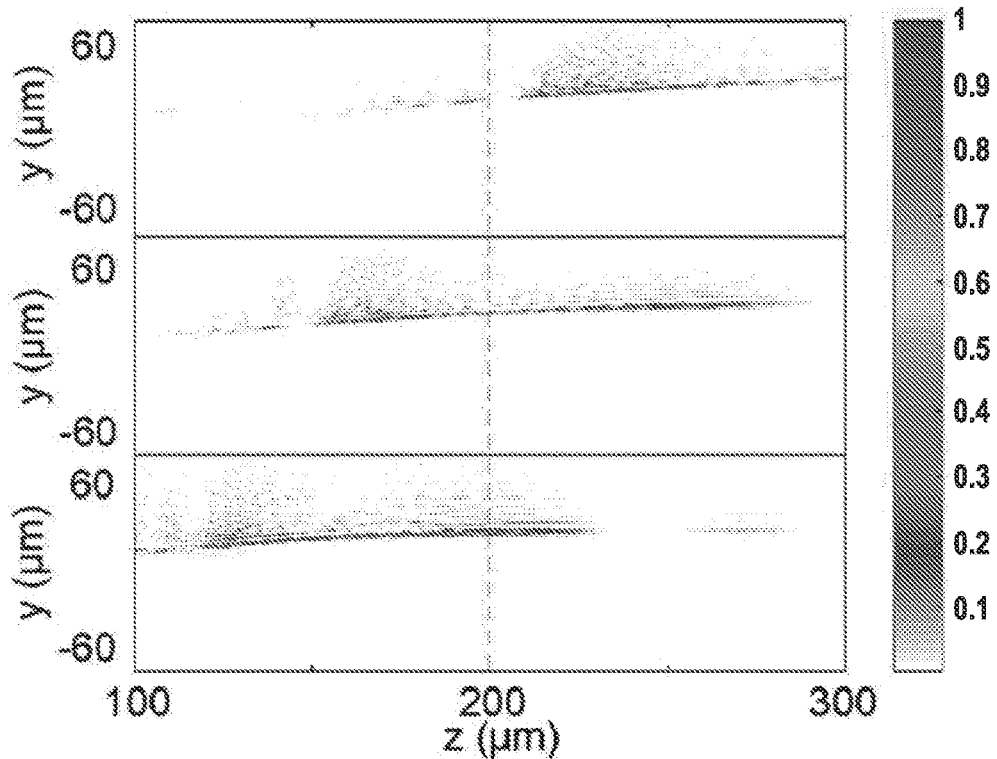
Figure 13E:
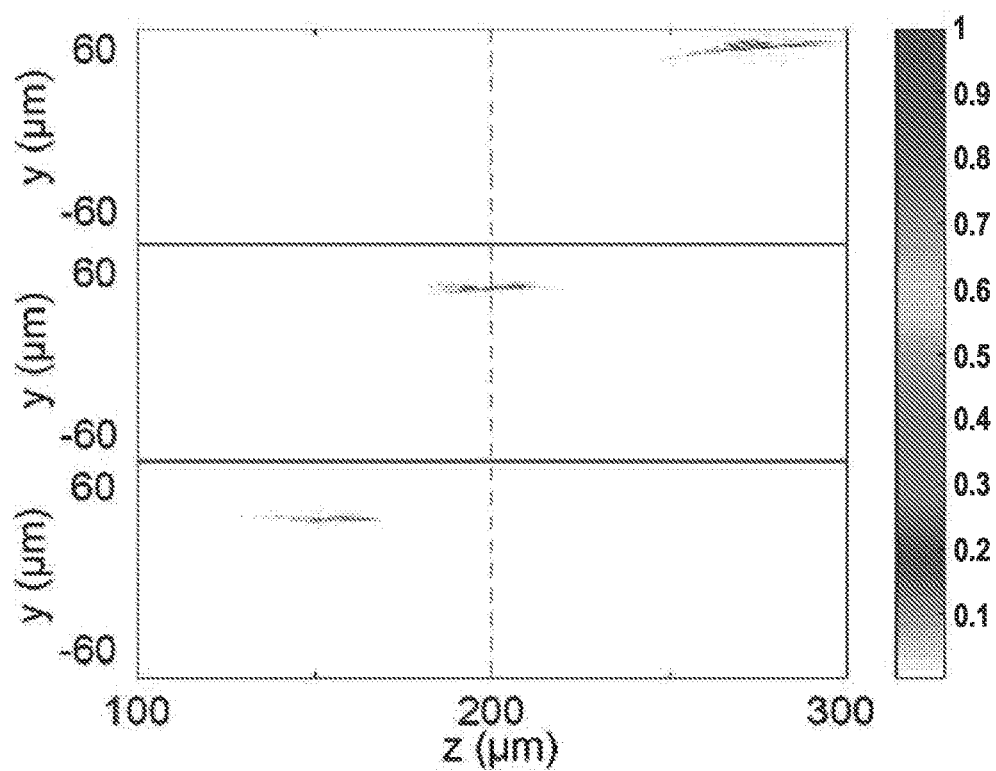
Figure 13F:
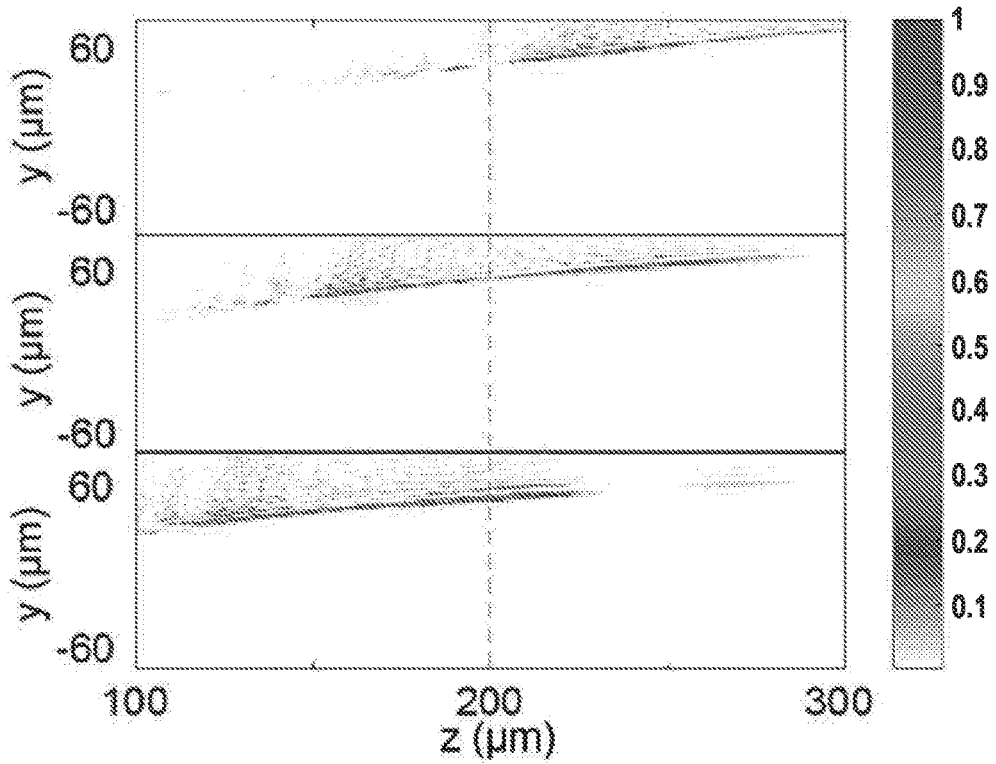

We measured our PSFs and imaged using incoherent light produced by LED sources. LEDs, however, have non-negligible bandwidth which reduces the spatial cutoff frequency of a system's MTF. To better understand the performance of our system, we compared the measured MTFs of our singlet and EDOF lenses to those of a diffraction-limited singlet lens of the same focal length and aperture width using 530 nm wavelength (the center wavelength of the green LED used for our measurements). An analytical solution exists for this MTF and is provided below for convenience, $$MTF(\rho) = \begin{cases} \frac{2}{\pi}\left[\cos^{-1}\left(\frac{\rho}{2\rho_0}\right) - \frac{\rho}{2\rho_0}\sqrt{1 - \left(\frac{\rho}{2\rho_0}\right)^2}\right], & \rho \leq 2\rho_0 \\ 0, & \text{otherwise} \end{cases}$$

where $\rho_0 = \frac{r}{\lambda z_i}$ and r is the aperture radius, λ is the wavelength, and $z_i$ is the image distance. This MTF is plotted in FIG. 12 in addition to the measured MTFs for our metalenses found elsewhere herein, as well as simulated singlet lens MTFs to understand the effect of the source bandwidth on system resolution. To simulate the MTFs, we used the same angular spectrum propagator as before to solve the Rayleigh-Sommerfeld diffraction integral and then calculated the MTF from the resulting focal spot. With 0 nm source bandwidth, our simulated MTF closely matches the analytical diffraction-limited solution. For a source with a FWHM of 30 nm (approximating the bandwidth of the green LED used in our experiments), however, the cutoff frequency reduces substantially to near 900 cycles/mm. Our measured MTFs for green light illumination (data reproduced from FIGS. 2A-2H) have lower cutoff frequencies than this ideal 30 nm simulation, which we attribute to the discrete spatial sampling of our phase profile, the 10 discrete (as opposed to continuous) phase steps in the 0 to 2π range we have using our scatterer designs, misfocus error when measuring our focal spot, and fabrication imperfections.

Off-Axis Metalens Performance

In addition to analyzing the performance of our devices under normal incidence, we also examined their performance when illuminated off-axis. For these simulations, we used the same angular spectrum propagator as before to solve the Rayleigh-Sommerfeld diffraction integral, but instead excite the element with a plane wave with a wavevector with a transverse component. FIGS. 13A-13F show the simulated intensity cross sections for both the singlet and EDOF metalenses for illumination angles of 0°, 5°, and 10°. From these simulations, we observe that the extension of the focal spot also occurs for off-axis illumination. In general, however, while the EDOF metalens can image off-axis, it is subject to geometric aberrations that will reduce the captured image quality. As our design focuses on reducing chromatic aberrations, it is not optimized for off-axis imaging. Combining our method with techniques to reduce geometric aberrations, such as using a stacked design with a fisheye lens, could mitigate this image quality reduction.

Methods

Design and Simulation

Figure 5:
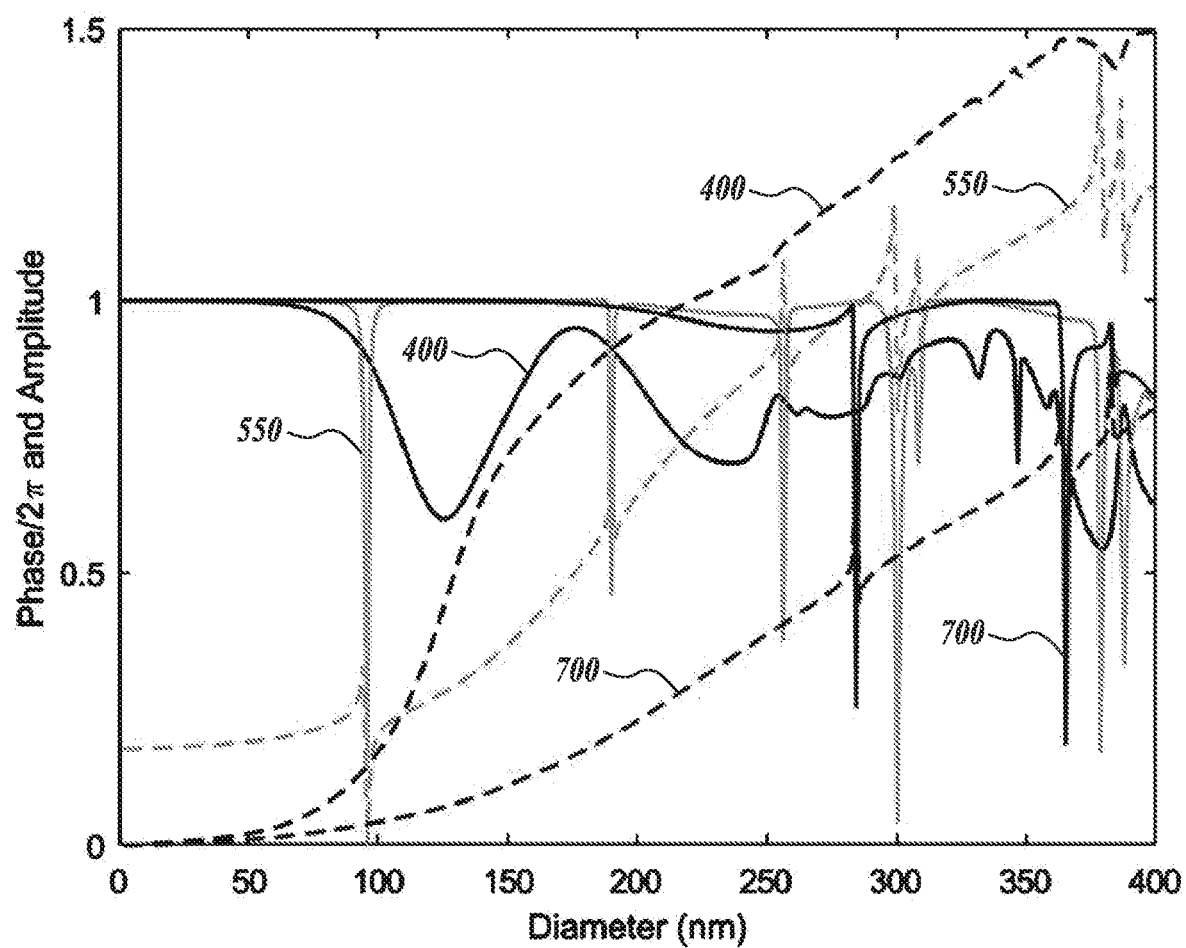
FIG. 5. Transmission amplitude and phase of the nanoposts as a function of diameter. Transmission coefficients for 400 nm (blue), 550 nm (green) and 700 nm (red) input wavelengths as a function of post diameter with a fixed thickness of 633 nm and lattice constant of 400 nm. The dashed lines are the phase and the solid are the corresponding amplitude.
Figure 6A:
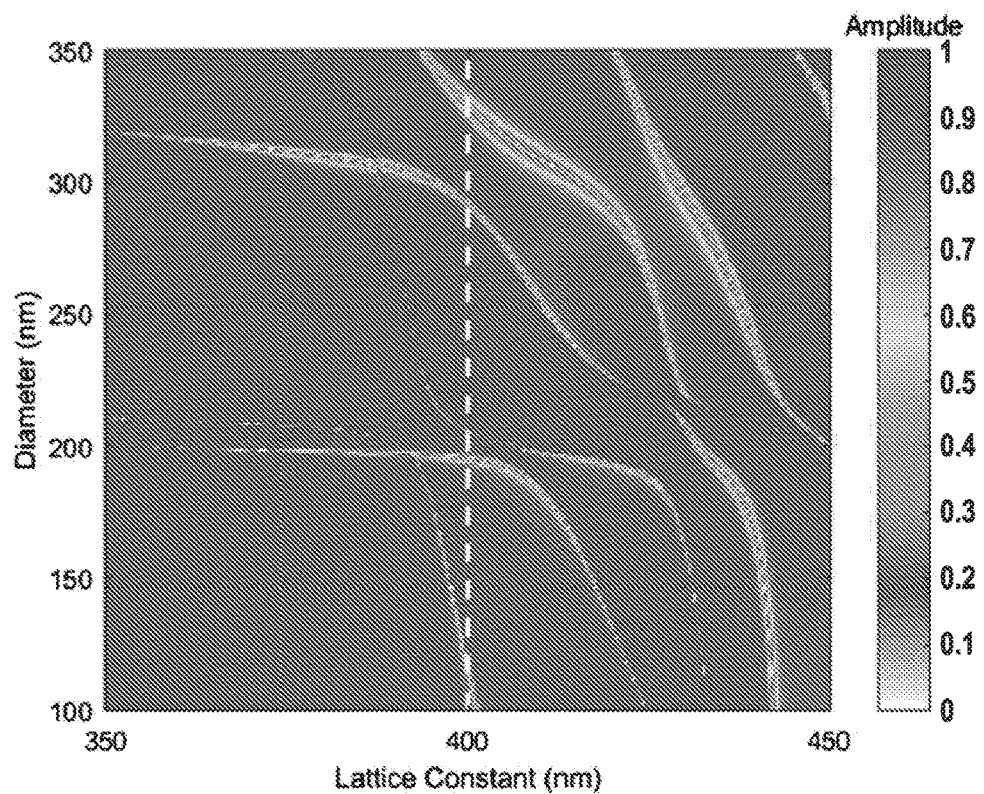
FIGS. 6A and 6B: Transmission amplitude and phase of the nanoposts as a function of lattice constant and diameter. Transmission amplitude (A) and phase (B) as a function of both post diameter and lattice constant with 550 nm wavelength. The dashed line indicates the lattice constant used in the designed metasurfaces.
Figure 6B:
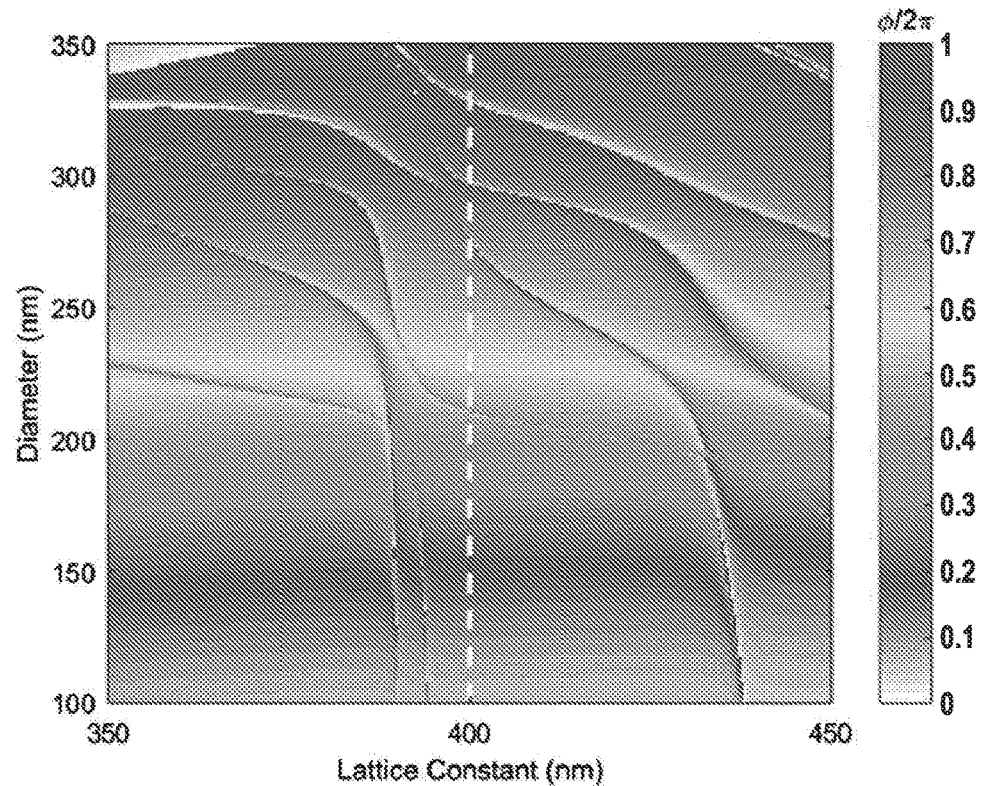

The nanoposts were designed to give 0 to a phase for wavelengths spanning the entire visible regime (400-700 nm) as the diameter of the posts were varied. FIG. 5 shows the transmission amplitude and phase for three representative wavelengths at 400 nm, 550 nm, and 700 nm, calculated via rigorous coupled-wave analysis (RCWA) simulation. The refractive indices used for both the silicon nitride posts and the silicon dioxide substrate accounted for dispersion. To ensure the nanopost design provided weakly coupled posts that would allow to make use of the unit cell approximation in implementing phase profiles, the transmission amplitude (FIG. 6A) and phase (FIG. 6B) as a function of diameter were simulated as the lattice constant was swept to show minimal change in phase over a wide range of lattice constants. To design the metasurfaces nominally for 550 nm, the RCWA data served as a lookup table for mapping the phase at a given position to the post diameter which most accurately provides the desired phase. Due to the large spatial extent of our designs, the memory requirements were beyond our available computational resources to perform a full finite-difference time-domain (FDTD) simulation of our devices. As such, the RCWA-calculated transmission coefficients were used and metasurfaces were modeled as complex amplitude masks and further, their performance was simulated by evaluating the Rayleigh-Sommerfeld diffraction integral using an angular spectrum propagator.

Fabrication

In one embodiment, a 633 nm film of silicon nitride was first deposited on a fused silica wafer substrate via plasma-enhanced chemical vapor deposition. The wafer was temporarily coated with a protective photoresist layer and diced into smaller pieces before cleaning by sonication in acetone and isopropyl alcohol. The sample was then spin coated with ZEP-520A before sputtering 8 nm of Au/Pd as a charge dissipation layer. The sample was exposed using a JEOL JBX6300FS electron-beam lithography system and the charge dissipation layer was removed by type TFA gold etchant. After developing in amyl acetate, a layer of aluminum was evaporated onto the sample and after performing lift-off, an aluminum hard mask was left on the silicon nitride layer for subsequent etching. The sample was etched using an inductively coupled plasma etcher with a $CHF_3$ and $O_2$ chemistry and the remaining aluminum was removed by immersing in AD-10 photoresist developer. Scanning electron micrographs of the fabricated devices are presented in FIGS. 7A and 7B.

Device Characterization

Figure 14:
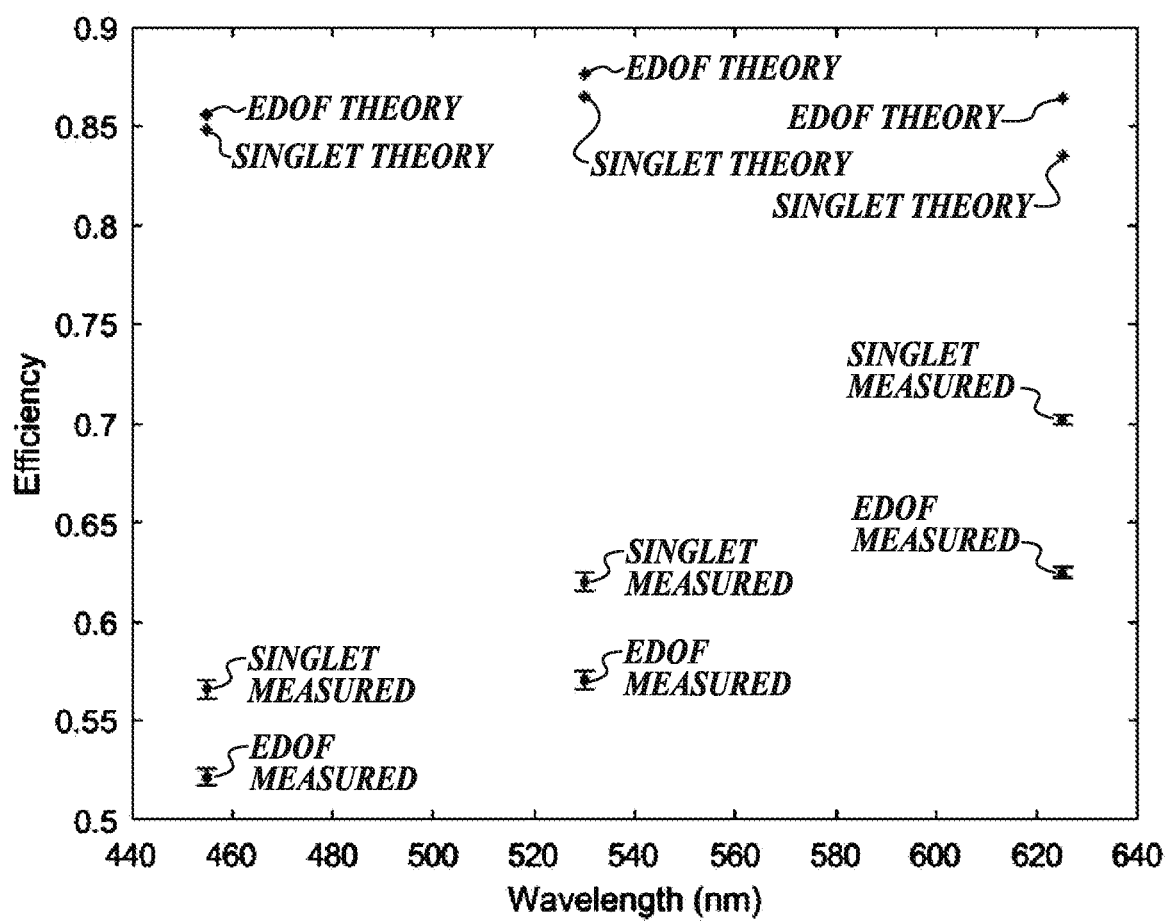
FIG. 14. Efficiencies of the singlet and EDOF metalenses. The efficiencies of the singlet and EDOF metalenses are shown for the three wavelengths of the LEDs used in the imaging experiments. The efficiency is defined as the ratio of the optical power at the focal plane to that of the incident beam. Error bars represent the 95% confidence interval and were found by propagating the standard deviation of three measurements. The theoretical efficiencies were calculated via the Rayleigh-Sommerfeld diffraction integral. The measured efficiencies are lower than the theoretically calculated efficiencies, which we attribute to fabrication imperfections. We also attribute the increasing measured efficiency with wavelength to fabrication imperfections, as discrepancies in the dimensions of the fabricated structures are more detrimental for shorter wavelengths.

The focal planes of the fabricated metasurfaces were characterized via the experimental setup presented in FIG. 8. Light from a fiber-coupled LED illuminates the metasurface under test and a custom microscope assembled from a translatable stage, objective, tube lens, and camera takes snapshots of the focal plane of the device. To measure the efficiency (FIG. 14), the same setup was used with the addition of a flip mirror, pinhole, and photodetector (Newport 818-SL). The efficiency was calculated by taking the ratio of the power at the focal plane to that of the incident beam. The incident beam power was found by measuring the power through a piece of glass with the pinhole aperture set to image a region equal to the width of the metalens. The camera was corrected for dark noise by taking a sequence of calibration images with the lens cap on. The modulation transfer functions (MTFs) of lenses were determined by Fourier transforming and then taking the magnitude of the measured focal spot.

Imaging

Images were captured using the setup shown in FIG. 9. Light from a fiber-coupled LED is incident off-axis on a pattern printed on standard 8.5"×11" paper. The metasurface creates an image near its focal plane by focusing light scattered off the printed pattern and a translatable microscope consisting of an objective, tube lens, and camera capture this image. Prior to image capture, the camera's dark noise is subtracted after taking a sequence of pictures with the lens cap on.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

The embodiments of the invention in which an exclusive property of privilege is claimed are defined as follows:

1. A metasurface having an optical activity that includes lensing and wavefront coding over a wavelength range, comprising:
   a plurality of posts comprising a first material having a first refractive index and arranged on a substrate in a square pattern; and
   interstices between individual posts of the plurality of posts comprising an interstitial substance with a second refractive index less than the first refractive index;
   wherein a diameter of the posts of the plurality of posts varies rotationally asymmetrically about an optical axis of the metasurface, wherein at least a portion of the metasurface defines a lens shaped to produce a lensing effect on light in the wavelength range passing through the metasurface, wherein the lensing effect is at least in part based on a gradient of the diameter of the posts along a length of the metasurface, and wherein differences in the diameter of the posts are configured to alter a phase of light passing through the metasurface.

2. The metasurface of claim 1, wherein the metasurface is configured to focus light in the wavelength range passed through the metasurface in an extended depth of focus.

3. The metasurface of claim 2, wherein the extended depth of focus is substantially spectrally invariant over the wavelength range.

4. The metasurface of claim 1, wherein the metasurface is configured to code a wavefront of light in the wavelength range passing through the metasurface.

5. The metasurface of claim 1, wherein the metasurface is a cubic phase plate defined by patterning and a difference in diffraction between portions of the metasurface.

6. The metasurface of claim 5, wherein a phase profile of light passed through the metasurface is given by the equation:

$$\varphi = \frac{2\pi}{\lambda}\left(\sqrt{x^2 + y^2 + f^2} - f\right) + \frac{\alpha}{L^3}(x^3 + y^3)$$

wherein, f is a focal length of the metasurface, x and y are coordinates of the metasurface in a plane of the substrate, z is a propagation direction of the metasurface, λ is an operating wavelength of the metasurface, L is half of an aperture width of the metasurface, and α is cubic phase strength of the of metasurface.

7. The metasurface of claim 6, wherein a is in a range of about 0π to about 200π.

8. The metasurface of claim 1, wherein the wavelength range includes light in a range of about 400 nm to about 700 nm.

9. The metasurface of claim 1, wherein the first material is silicon nitride.

10. The metasurface of claim 1, wherein the interstitial substance is air or a polymer.

11. The metasurface of claim 1, wherein a periodicity of the plurality of posts is less than a smallest wavelength in the wavelength range; wherein a diameter of the plurality of posts is in a range of about 25% of the smallest wavelength in the wavelength range and about 90% of the smallest wavelength in the wavelength range, and wherein a thickness of the plurality of posts is in a range of about 0.75 times a mean wavelength of the wavelength range and about 1.5 times the mean wavelength of the wavelength range.

12. An imaging system comprising:
a metasurface having an optical activity that includes lensing and wavefront coding over a wavelength range, wherein at least a portion of the metasurface defines a lens shaped to produce a lensing effect on light in the wavelength range passing through the metasurface, the metasurface comprising:
a plurality of posts comprising a first material having a first refractive index and arranged on a substrate in a square pattern; and
interstices between individual posts of the plurality of posts comprising an interstitial substance with a second refractive index less than the first refractive index,
wherein a diameter of the posts of the plurality of posts varies rotationally asymmetrically about an optical axis of the metasurface, wherein the lensing effect is at least in part based on a gradient of the diameter of the posts along a length of the metasurface, and wherein differences in the diameter of the posts are configured to alter a phase of light passing through the metasurface;
a photodetector positioned to absorb light that has passed through the metasurface and configured to generate a signal based upon the absorbed light; and
a controller operatively coupled to the photodetector, the controller including logic that when executed by the controller, causes the device to perform operations including:
generating a plurality of signals, with the photodetector, based upon light within the wavelength range passed through the metasurface;
computationally reconstructing the plurality of signals to provide a plurality of computationally reconstructed signals; and
generating, with the plurality of computationally reconstructed signals, an image based upon the light absorbed by the photodetector.

13. The system of claim 12, wherein the metasurface is configured to focus light in the wavelength range passing through the metasurface in an extended depth of focus.

14. The system of claim 13, wherein the extended depth of focus is substantially spectrally invariant over the wavelength range.

15. The system of claim 12, wherein computationally reconstructing the plurality of signals includes digitally filtering the plurality of signals.

16. The system of claim 15, wherein digitally filtering the plurality of signals includes digitally filtering the plurality of signals with a Wiener filter.

17. The system of claim 13, wherein the controller further includes logic that when executed by the controller, causes the device to perform operations including:
deconvoluting the plurality of signals to account for and counteract a deviation of focusing behavior of the metasurface from ideal lensing of the metasurface.

18. The system of claim 12, further comprising a second metasurface, wherein the metasurface and the second metasurface are configured such that displacement of the second metasurface relative to the optical axis of the metasurface provides a non-linear change in focus.

19. The system of claim 12, further comprising a refractive lens having an optical axis positioned coaxially with the optical axis of the metasurface.

20. A method of generating an image comprising:
generating a plurality of signals with a photodetector based on light passed through a metasurface having an optical activity that includes lensing and wavefront coding over a wavelength range, wherein the metasurface defines a lens shaped to produce a lensing effect on light in the wavelength range passing through the metasurface, and wherein the metasurface comprises:
a plurality of posts comprising a first material having a first refractive index and arranged on a substrate in a square pattern; and
interstices between individual posts of the plurality of posts comprising an interstitial substance with a second refractive index less than the first refractive index,
wherein a diameter of the posts of the plurality of posts varies rotationally asymmetrically about an optical axis of the metasurface, wherein the lensing effect is at least in part based on a gradient of the diameter of the posts along a length of the metasurface, and wherein differences in the diameter of the posts are configured to alter a phase of light passing through the metasurface;
computationally reconstructing the plurality of signals to provide a plurality of computationally reconstructed signals; and
generating, with the plurality of computationally reconstructed signals, an image based upon the light absorbed by the photodetector.

\* \* \* \* \*

UNITED STATES PATENT AND TRADEMARK OFFICE
CERTIFICATE OF CORRECTION

Page 1 of 1

PATENT NO. : 12,061,347 B2
APPLICATION NO. : 16/965899
DATED : August 13, 2024
INVENTOR(S) : S. Colburn et al.

It is certified that error appears in the above-identified patent and that said Letters Patent is hereby corrected as shown below:

In the Claims

| Column | Line | |
|--------|------|---|
| 19 | 8 | change "of the of" to -- of the --. |
| 19 | 9 | change "a is" to -- $\alpha$ is --. |
| 19 | 10 | change "On" to -- $0\pi$ --. |

Signed and Sealed this
Eighth Day of October, 2024

Katherine Kelly Vidal
*Director of the United States Patent and Trademark Office*